(12) United States Patent
Jung et al.

(10) Patent No.: US 11,196,606 B2
(45) Date of Patent: Dec. 7, 2021

(54) METHOD FOR TRANSMITTING AND RECEIVING SYNCHRONIZATION SIGNAL IN COMMUNICATION SYSTEM

(71) Applicant: ELECTRONICS AND TELECOMMUNICATIONS RESEARCH INSTITUTE, Daejeon (KR)

(72) Inventors: Hoi Yoon Jung, Daejeon (KR); Sung Ik Park, Daejeon (KR); Heung Mook Kim, Daejeon (KR); Nam Ho Hur, Sejong (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 9 days.

(21) Appl. No.: 16/635,412

(22) PCT Filed: Jul. 25, 2018

(86) PCT No.: PCT/KR2018/008423
§ 371 (c)(1),
(2) Date: Jan. 30, 2020

(87) PCT Pub. No.: WO2019/027180
PCT Pub. Date: Feb. 7, 2019

(65) Prior Publication Data
US 2020/0344103 A1  Oct. 29, 2020

(30) Foreign Application Priority Data

Jul. 31, 2017 (KR) ......................... 10-2017-0097309
Aug. 7, 2017 (KR) ......................... 10-2017-0099791
(Continued)

(51) Int. Cl.
*H04L 27/26* (2006.01)
*H04W 76/11* (2018.01)
(Continued)

(52) U.S. Cl.
CPC ........ *H04L 27/2656* (2013.01); *H04L 1/1614* (2013.01); *H04L 5/10* (2013.01);
(Continued)

(58) Field of Classification Search
None
See application file for complete search history.

(56) References Cited

U.S. PATENT DOCUMENTS 10,660,102 B1 *  5/2020  Patel .................. H04W 48/00
2017/0288763 A1  10/2017  Yoo et al.
(Continued)

FOREIGN PATENT DOCUMENTS

KR  10-2017-0093720 A  8/2017
WO  2017/196083 A1  11/2017
(Continued)

OTHER PUBLICATIONS

Huawei et al., "SS Burst Set and Block Composition", R1-1709912, 3GPP TSG RAN WG1 NR Ad Hoc Meeting, Qingdao, China, Jun. 17, 2017.
(Continued)

*Primary Examiner* — Otis L Thompson, Jr.
(74) *Attorney, Agent, or Firm* — Rabin & Berdo, P.C.

(57) ABSTRACT

A method for transmitting and receiving a synchronization signal in a communication system is disclosed. An operation method of a terminal comprises the steps of: receiving, from a base station, a synchronization signal and an SS block including a PBCH; estimating y bits among x bits for indicating a number of a system frame on which the SS block has been transmitted, on the basis of a sequence used for the scrambling of the PBCH included in the SS block; decoding the PBCH included in the SS block so as to acquire z bits among the x bits for indicating the number of the system frame on which the SS block has been transmitted;
(Continued)

and confirming the number of the system frame on the basis of the y bits and the z bits. Therefore, the performance of a communication system can be improved.

20 Claims, 32 Drawing Sheets

(30) Foreign Application Priority Data

| | | | |
|---|---|---|---|
| Aug. 10, 2017 | (KR) | ........................ | 10-2017-0101397 |
| Aug. 11, 2017 | (KR) | ........................ | 10-2017-0102629 |
| Sep. 15, 2017 | (KR) | ........................ | 10-2017-0118946 |
| Jan. 19, 2018 | (KR) | ........................ | 10-2018-0007104 |
| Feb. 12, 2018 | (KR) | ........................ | 10-2018-0016844 |
| Feb. 13, 2018 | (KR) | ........................ | 10-2018-0018023 |

(51) Int. Cl.

| | |
|---|---|
| *H04W 76/27* | (2018.01) |
| *H04L 1/16* | (2006.01) |
| *H04L 5/10* | (2006.01) |
| *H04W 56/00* | (2009.01) |
| *H04W 72/00* | (2009.01) |

(52) U.S. Cl.
CPC ...... *H04L 27/2605* (2013.01); *H04L 27/2613* (2013.01); *H04L 27/2666* (2013.01); *H04W 56/001* (2013.01); *H04W 72/005* (2013.01); *H04W 76/11* (2018.02); *H04W 76/27* (2018.02)

(56) References Cited

U.S. PATENT DOCUMENTS

| | | | |
|---|---|---|---|
| 2017/0311276 A1 | 10/2017 | Tsai et al. | |
| 2017/0353256 A1 | 12/2017 | Islam et al. | |
| 2017/0353257 A1 | 12/2017 | Islam et al. | |
| 2018/0035396 A1 | 2/2018 | Stirling-Gallacher et al. | |
| 2018/0227867 A1* | 8/2018 | Park | H04W 56/001 |
| 2018/0324678 A1* | 11/2018 | Chen | H04W 8/08 |
| 2018/0324732 A1* | 11/2018 | Park | H04W 72/12 |
| 2018/0324804 A1* | 11/2018 | Aiba | H04L 5/0092 |
| 2018/0331802 A1* | 11/2018 | Bhattad | H04W 36/0072 |
| 2019/0013917 A1* | 1/2019 | Nam | H04J 11/0086 |
| 2019/0014493 A1* | 1/2019 | Kim | H04W 76/27 |
| 2019/0037508 A1* | 1/2019 | Sun | H04L 27/2611 |
| 2019/0199456 A1* | 6/2019 | Chopra | H04B 17/309 |
| 2019/0230550 A1* | 7/2019 | Yiu | H04W 24/10 |
| 2020/0067674 A1* | 2/2020 | Guan | H04L 5/00 |
| 2020/0100238 A1* | 3/2020 | da Silva | H04W 72/0446 |
| 2020/0314776 A1* | 10/2020 | Harada | H04W 72/0453 |
| 2020/0351886 A1* | 11/2020 | Si | H04L 1/0061 |
| 2021/0099328 A1* | 4/2021 | Ghosh | H04B 7/0617 |

FOREIGN PATENT DOCUMENTS

| | | | |
|---|---|---|---|
| WO | 2018/008981 A1 | 1/2018 | |
| WO | WO-2020197285 A1 * | 10/2020 | ........... H04B 7/0456 |

OTHER PUBLICATIONS

Interdigital Inc., "On SS Block Based Timing Indication in NR", R1-1710915, 3GPP TSG RAN WG1 NR AH#2, Qingdao, P.R. China, Jun. 20, 2017.

Nokia et al., "Cell Identification in NR", R1-1708240, 3GPP TSG-RAN WG1 Meeting #89, Hangzhou, P.R. China, May 5, 2017.

NTT Docomo, Inc., "Discussion on Remaining Details on Multiple SS Block Transmissions in Wideband CC for NR", R1-1711059, 3GPP TSG RAN WG1 NR Ad-Hoc#2, Qingdao, P.R. China, Jun. 17, 2017.

NTT Docomo, Inc., "Discussion on Timing Indication Based on SS Block for NR", R1-1711058, 3GPP TSG RAN WG1 NR Ad-Hoc#2, Qingdao, P.R. China, Jun. 20, 2017.

\* cited by examiner

METHOD FOR TRANSMITTING AND RECEIVING SYNCHRONIZATION SIGNAL IN COMMUNICATION SYSTEM

TECHNICAL FIELD

The present invention relates to a technique for transmitting and receiving a synchronization signal, and more particularly, to a method for configuring a synchronization signal, a method for transmitting and receiving a synchronization signal, and a method for synchronization acquisition in a communication system.

BACKGROUND ART

With the development of information and communication technology, various wireless communication technologies are being developed. Typical wireless communication technologies include long term evolution (LTE), new radio (NR), or the like defined as the 3rd generation partnership project (3GPP) standard. The LTE may be one of 4th generation (4G) wireless communication technologies, and the NR may be one of 5th generation (5G) wireless communication technologies.

A 5G communication system (e.g., communication system supporting the NR) using a frequency band (e.g., frequency band above 6 GHz) higher than a frequency band (e.g., frequency band below 6 GHz) of a 4G communication system (e.g., communication system supporting the LTE) as well as the frequency band of the 4G communication system has been considered for processing of wireless data which has rapidly increased since commercialization of the 4G communication system. The 5G communication system can support Enhanced Mobile Broadband (eMBB), Ultra-Reliable and Low-Latency Communication (URLLC), and massive Machine Type Communication (mMTC).

In order to support the various services in the 5G communication system, a variable system configuration needs to be supported. For example, the 5G communication system should be able to support variable subcarrier spacing in a multi-carrier transmission scheme. In the 5G communication system supporting the variable subcarrier spacing, a synchronization signal should be configured in consideration of the variable subcarrier spacing. However, in the 5G communication system supporting the variable subcarrier spacing, a method of configuring a synchronous signal, a method of transmitting and receiving a synchronous signal, a method of acquiring a synchronous signal, and the like are not clearly defined.

Meanwhile, the technology as the background of the invention is intended to enhance understanding of the background of the invention, and may include contents that are not known to the person of ordinary skill in the art.

DISCLOSURE

Technical Problem

The objective of the present invention to solve the above-described problem is to provide a method for transmitting and receiving a synchronization signal in a communication system.

Technical Solution

An operation method of a terminal, according to a first embodiment of the present invention for achieving the above-described objective, may comprise receiving an SS block including a synchronization signal and a PBCH from a base station; estimating y bits among x bits indicating a number of a system frame through which the SS block is transmitted based on a sequence used for scrambling the PBCH included in the SS block; obtaining z bits among x bits indicating the number of the system frame through which the SS block is transmitted by decoding the PBCH included in the SS block; and identifying the number of the system frame based on the y bits and the z bits, wherein each of x, y and z is an integer equal to or greater than 1, and each of y and z is an integer equal to or less than x.

Here, the y bits may be MSBs among the x bits, and the z bits may be LSBs among the x bits.

Here, the y bits may be LSBs among the x bits, and the z bits may be MSBs among the x bits.

Here, the sequence may be determined based on the y bits and a cell identifier (ID) of the base station.

Here, a type of the SS block may be a cell-defining SS block or a measurement SS block, and information indicating the type of the SS block may be included in the SS block.

An operation method of a terminal, according to a second embodiment of the present invention for achieving the above-described objective, may comprise receiving an RRC message including an indicator indicating an actual transmission position of an SS block from a base station; identifying the actual transmission position indicated by the indicator included in the RRC message; and acquiring the SS block from the base station by performing a monitoring operation at the actual transmission position indicated by the indicator.

Here, the operation method may further comprise, when the actual transmission position indicated by the indicator is overlapped with a PDSCH scheduled by the base station, obtaining data by performing rate matching on REs other than REs occupied by the SS block among REs constituting the PDSCH.

Here, the operation method may further comprise receiving information indicating candidate transmission positions of the SS block from the base station before receiving the RRC message including the indicator, wherein the actual transmission position is one or more among the candidate transmission positions.

Here, no signal other than the SS block may be received in the actual transmission position indicated by the indicator.

Here, the RRC message may include information indicating an index of a half frame through which the SS block is transmitted.

Here, the RRC message may include information indicating an index of an SS block burst through which the SS block is transmitted.

Here, the information indicating the index of the SS block burst may be configured in a bitmap form.

Here, a type of the SS block may be a cell-defining SS block or a measurement SS block, and information indicating the type of the SS block may be included in the RRC message.

An operation method of a terminal, according to a third embodiment of the present invention for achieving the above-described objective, may comprise receiving an SS block including a synchronization signal, a PBCH, and a DMRS from a base station; obtaining the DMRS from the SS block; and obtaining information indicating an index of the SS block based on a sequence used for generating the DMRS.

Here, the sequence may be determined based on the y bits and a cell ID of the base station.

Here, when the information indicating the index of the SS block is configured using x bits, y bits among the x bits may be used for indicating the index of the SS block, (x-y) bits among the x bits may be used for indicating an index of a half frame through which the SS block is transmitted, each of x and y may be an integer equal to or greater than 1, and y may be an integer less than x.

Here, the PBCH may include information indicating an index of a half frame through which the SS block is transmitted.

Here, the PBCH may include information indicating an index of an SS block burst through which the SS block is transmitted.

Here, the information indicating the index of the SS block burst may be configured in a bitmap form.

Here, a type of the SS block may be a cell-defining SS block or a measurement SS block, and information indicating the type of the SS block may be included in the SS block.

Advantageous Effects

According to the present invention, a number identifying a system frame through which a synchronization signal (SS) block is transmitted may be indicated by a scrambling sequence for a physical broadcast channel (PBCH) included in the SS block. Therefore, a user equipment (UE) receiving the SS block can confirm the number identifying the system frame through which the SS block is transmitted based on the scrambling sequence for the PBCH included in the SS block.

Also, an index of the SS block may be indicated by a sequence used for generating a demodulation reference signal (DMRS) included in the SS block. Therefore, the UE receiving the SS block can identify the index of the SS block based on the DMRS included in the SS block. Further, the PBCH included in the SS block may include information indicating at least one of an index of a half frame and an index of an SS block burst through which the SS block is transmitted. Therefore, the UE receiving the SS block can identify the index of the half frame, the index of the SS block burst, and the like based on the PBCH included in the SS block.

That is, the UE can obtain synchronization related information (e.g., system frame number (SFN), SS block index, half frame index, SS block burst index, etc.) from the SS block. Therefore, the performance of the communication system can be improved.

MODES OF THE INVENTION

Figure 1:
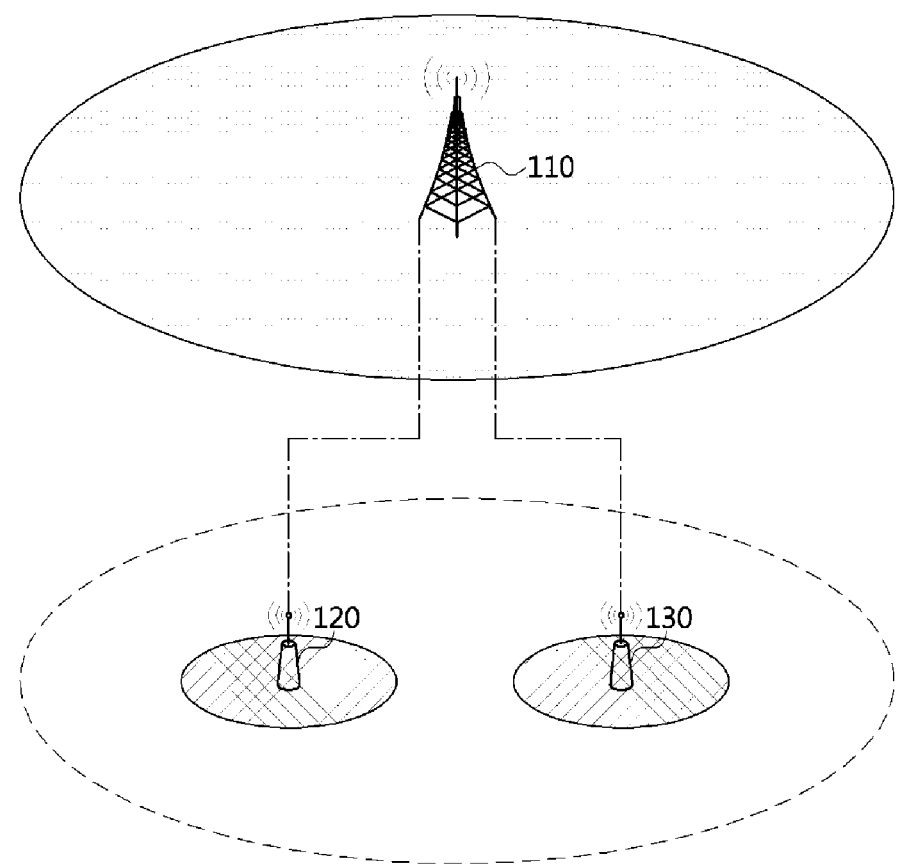
FIG. 1 is a conceptual diagram illustrating a first embodiment of a wireless communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A wireless communication network to which embodiments according to the present invention are applied will be described. The wireless communication network to which the embodiments according to the present invention are applied is not limited to the following description, and the embodiments according to the present invention can be applied to various wireless communication networks. Here, the wireless communication network may be used in the same sense as a wireless communication system.

FIG. 1 is a conceptual diagram illustrating a first embodiment of a wireless communication network.

Referring to FIG. 1, a first base station 110 may support a cellular communication (e.g., long term evolution (LTE), LTE-advance (LTE-A), new radio (NR), etc. specified in the $3^{rd}$ generation partnership project (3GPP)), or the like. The first base station 110 may support multiple input multiple output (MIMO) (e.g., single-user MIMO (SU-MIMO), multi-user MIMO (MU-MIMO), massive MIMO, etc.), coordinated multipoint (CoMP), carrier aggregation (CA), or the like.

The first base station 110 may operate in a frequency band F1 and may form a macro cell. The first base station 110 may be connected to another base station (e.g., second base station 120, third base station 130, etc.) through an ideal backhaul or a non-ideal backhaul. The second base station 120 may be located within the coverage of the first base station 110. The second base station 120 may operate in a frequency band F2 and may form a small cell. The communication scheme (e.g., NR) supported by the second base station 120 may be different from the communication scheme of the first base station 110 (e.g., LTE).

The third base station 130 may be located within the coverage of the first base station 110. The third base station 130 may operate in the frequency band F2 and may form a small cell. The communication scheme (e.g., NR) supported by the third base station 120 may be different from the communication scheme of the first base station 110 (e.g., LTE). Each of the first base station 110 and a user equipment (UE) (not shown) connected to the first base station 110 may transmit and receive signals through a carrier aggregation (CA) between the frequency band F1 and the frequency band F2. Alternatively, each of the UE connected to the first base station 110 and the first base station 110 may support dual-connectivity (DC) for the frequency band F1 and the frequency band F2, and may transmit and receive signals in the DC environment.

The communication node (i.e., base station, UE, etc.) constituting the wireless communication network described above may supporting a code division multiple access (CDMA) based communication protocol, a wideband CDMA (WCDMA) based communication protocol, a time division multiple access (TDMA) based communication protocol, a frequency division multiple access (FDMA) based communication protocol, a single carrier-FDMA (SC-FDMA) based communication protocol, an orthogonal frequency division multiplexing (OFDM) based communication protocol, an orthogonal frequency division multiple access (OFDMA) based communication protocol, or the like.

Among the communication nodes, the base station may be referred to as a Node B, an evolved Node B, a 5G Node B (gNodeB), a base transceiver station (BTS), a radio base station, a radio transceiver, an access point, an access node, a transmission/reception point (Tx/Rx Point), or the like. Among the communication nodes, the UE may be referred to as a terminal, an access terminal, a mobile terminal, a station, a subscriber station, a portable subscriber station, a mobile station, a node, a device, or the like. The communication node may have the following structure.

Figure 2:
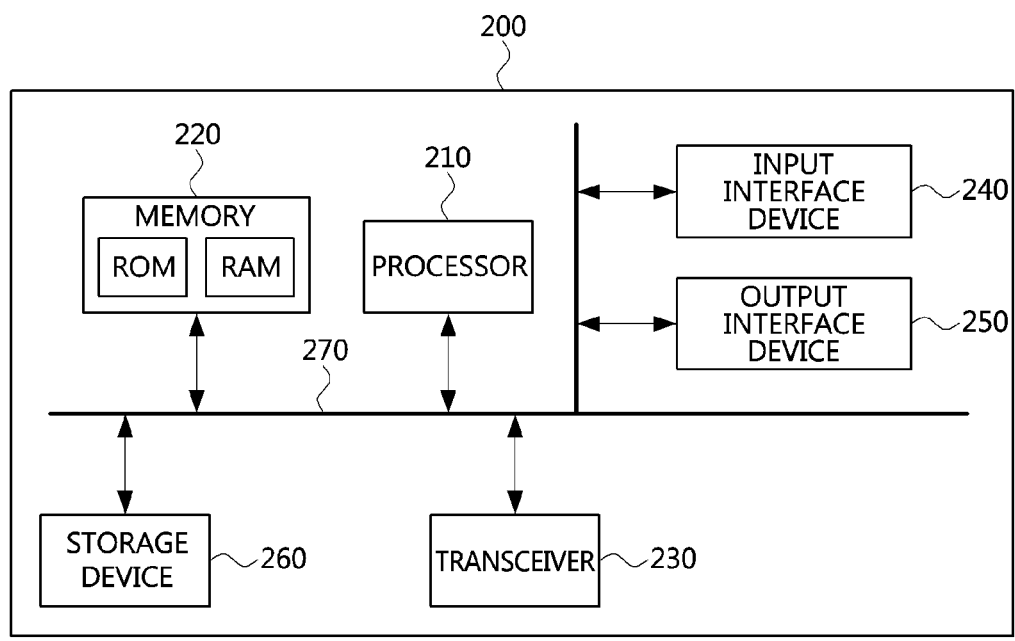
FIG. 2 is a block diagram illustrating a first embodiment of a communication node constituting a wireless communication network.

FIG. 2 is a block diagram illustrating a first embodiment of a communication node constituting a wireless communication network.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Next, operation methods of a communication node in a wireless communication network will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE is described, a corresponding base station may perform an operation corresponding to the operation of the UE. Conversely, when an operation of the base station is described, the corresponding UE may perform an operation corresponding to the operation of the base station.

Figure 3:
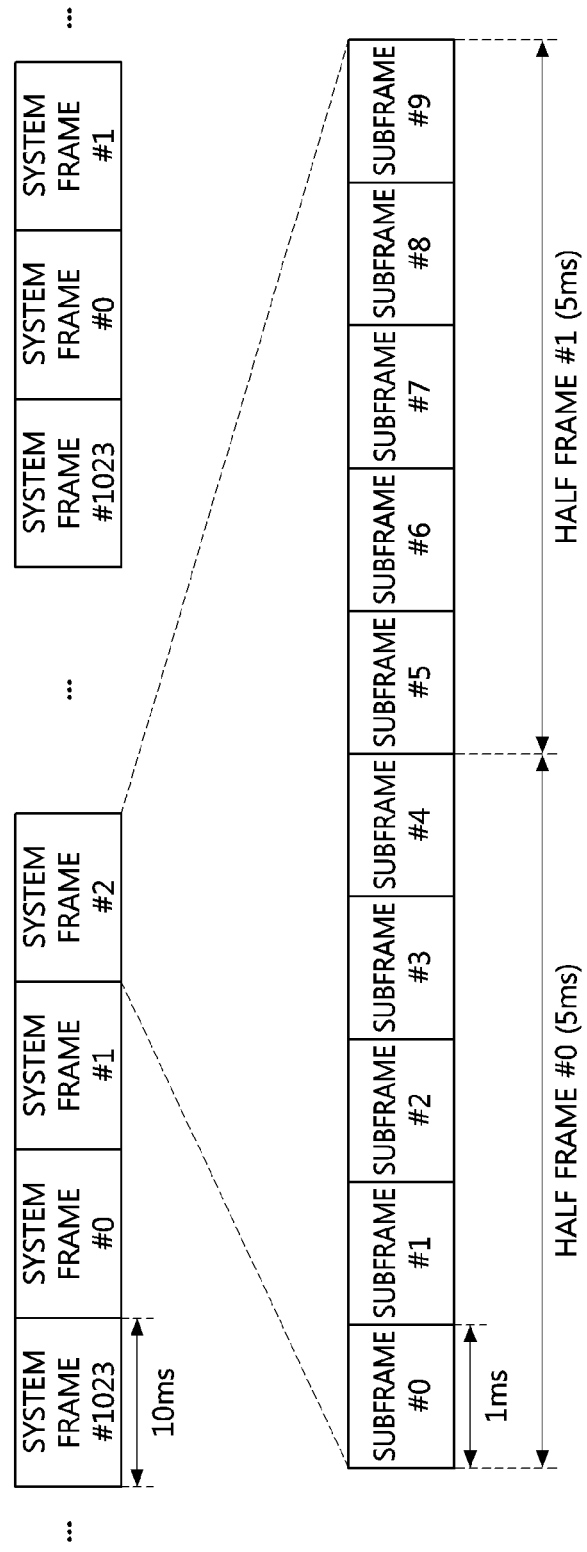
FIG. 3 is a conceptual diagram illustrating a first embodiment of a system frame configuration in a wireless communication network.

FIG. 3 is a conceptual diagram illustrating a first embodiment of a system frame configuration in a wireless communication network.

Referring to FIG. 3, time resources in a wireless communication network may be divided into frames. For example, system frames each of which has a length of 10 milliseconds (ms) may be configured consecutively in the time axis of the wireless communication network. System frame numbers (SFNs) may set to #0 to #1023. In this case, 1024 system frames may be repeated in the time axis of the wireless communication network. For example, an SFN of a system frame after the system frame #1023 may be set to #0. One system frame may comprise two half frames, and the length of one half frame may be 5 ms. A half frame located in a starting region of a system frame may be referred to as a 'half frame #0', and a half frame located in an ending region of the system frame may be referred to as a 'half frame #1'. The system frame may include 10 subframes, and the length of one subframe may be 1 ms. 10 subframes within one system frame may be referred to as 'subframes #0 to #9'.

Figure 4:
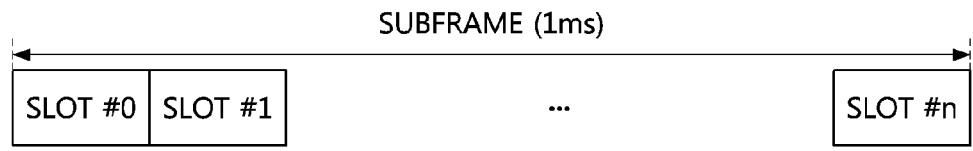
FIG. 4 is a conceptual diagram illustrating a first embodiment of a subframe configuration in a wireless communication network.

FIG. 4 is a conceptual diagram illustrating a first embodiment of a subframe configuration in a wireless communication network.

Referring to FIG. 4, one subframe may include n slots, and n may be an integer of 1 or more. Accordingly, one subframe may be composed of one or more slots.

Figure 5:
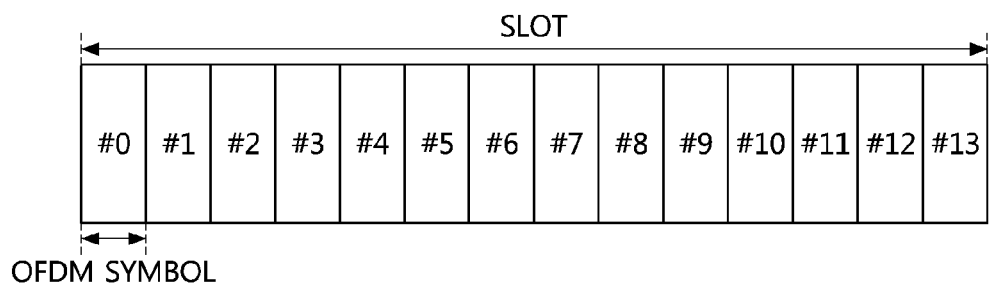
FIG. 5 is a conceptual diagram illustrating a first embodiment of a slot configuration in a wireless communication network.

FIG. 5 is a conceptual diagram illustrating a first embodiment of a slot configuration in a wireless communication network.

Referring to FIG. 5, one slot may comprise one or more OFDM symbols. For example, one slot may be composed of 14 OFDM symbols. Here, the length of the slot may vary depending on the number of OFDM symbols included in the slot and the length of the OFDM symbol. The OFDM symbol may be configured as a downlink symbol, an unknown symbol, or an uplink symbol.

Figure 6:
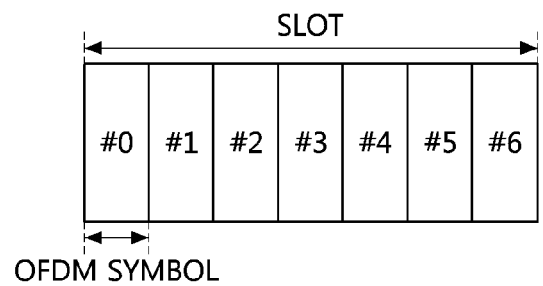
FIG. 6 is a conceptual diagram illustrating a second embodiment of a slot configuration in a wireless communication network.

FIG. 6 is a conceptual diagram illustrating a second embodiment of a slot configuration in a wireless communication network.

Referring to FIG. 6, one slot may comprise 7 OFDM symbols. Here, the length of the slot may vary depending on the number of OFDM symbols included in the slot and the length of the OFDM symbol. The OFDM symbol may be configured as a downlink symbol, an unknown symbol, or an uplink symbol.

Figure 7A:
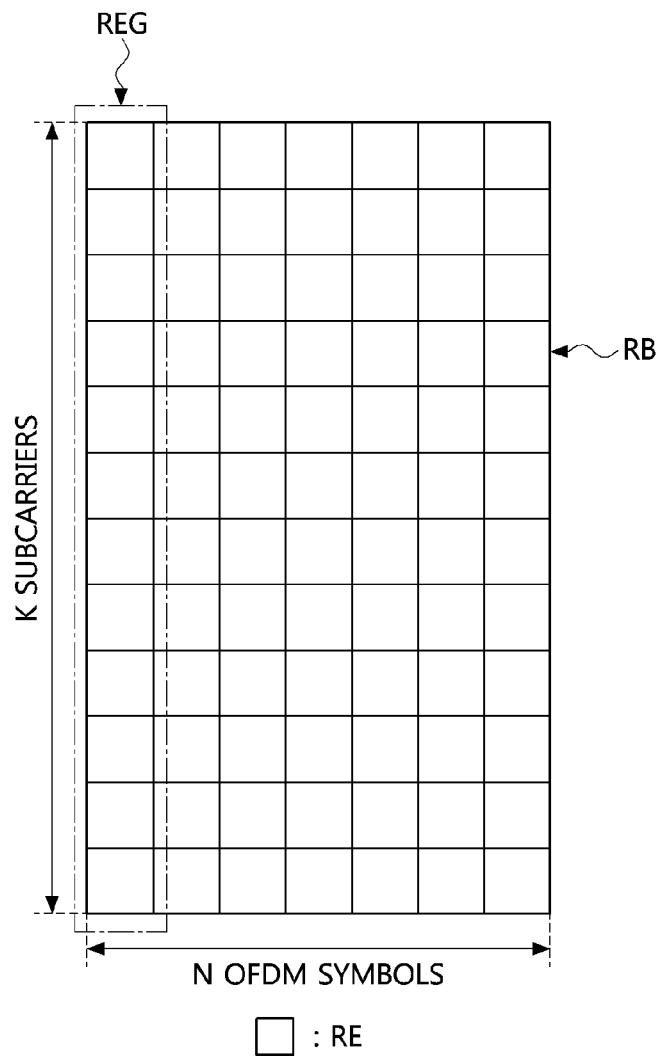
FIG. 7A is a conceptual diagram illustrating a first embodiment of time-frequency resources in a wireless communication network.

FIG. 7A is a conceptual diagram illustrating a first embodiment of time-frequency resources in a wireless communication network.

Referring to FIG. 7A, a resource configured with one OFDM symbol in the time axis and one subcarrier in the frequency axis may be defined as a 'resource element (RE)'. Resources configured with one OFDM symbol in the time axis and K subcarriers in the frequency axis may be defined as a 'resource element group (REG)'. One REG may include K REs. Here, K may be 12. Resources configured with N OFDM symbols in the time axis and K subcarriers in the frequency axis may be defined as a 'resource block (RB)'. Here, N may be 6, 7, or 14. The RB may be used as a basic unit of data resource allocation.

Figure 7B:
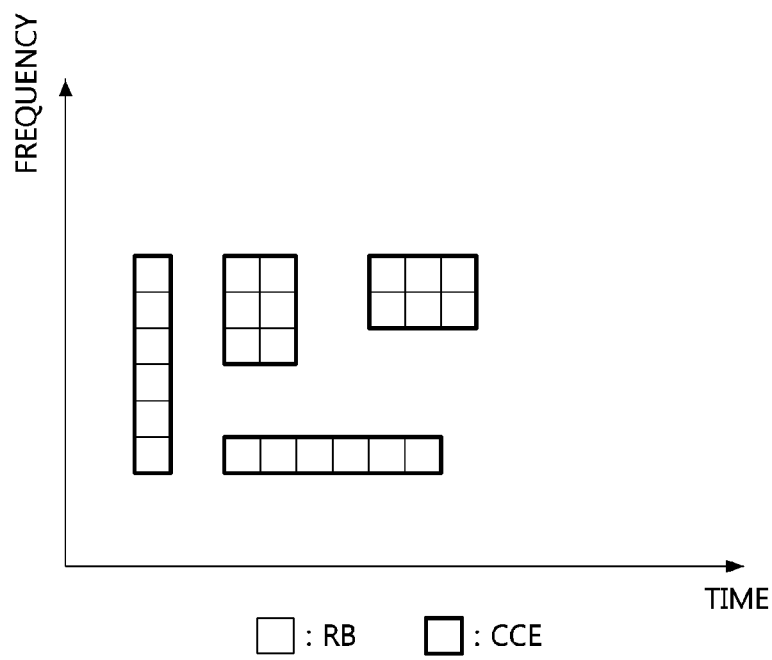
FIG. 7B is a conceptual diagram illustrating a first embodiment of control channel element (CCE) configuration in a wireless communication system.

FIG. 7B is a conceptual diagram illustrating a first embodiment of control channel element (CCE) configuration in a wireless communication system.

Referring to FIG. 7B, the CCE may comprise 6 RBs. For example, the CCE may comprise 6 consecutive RBs in the time axis. Alternatively, the CCE may comprise 6 consecutive RBs in the frequency axis. Alternatively, the CCE may comprise resources (e.g., 2×3 RBs) consisting of 2 RBs consecutive in the time axis and 3 RBs consecutive in the frequency axis. Alternatively, the CCE may comprise resources (e.g., 3×2 RBs) consisting of 3 RBs consecutive in the time axis and 2 RBs consecutive in the frequency axis. The CCE may be used as a basic unit of control channel resource allocation.

Figure 8:
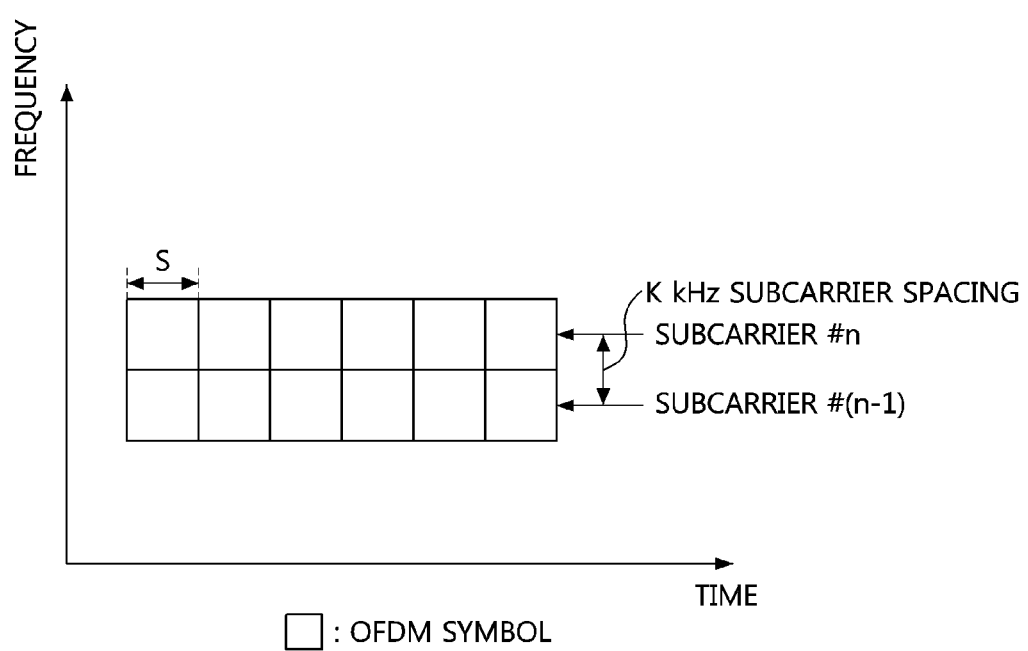
FIG. 8 is a conceptual diagram illustrating a first embodiment of time-frequency resources according to a subcarrier spacing in a wireless communication network.
Figure 9:
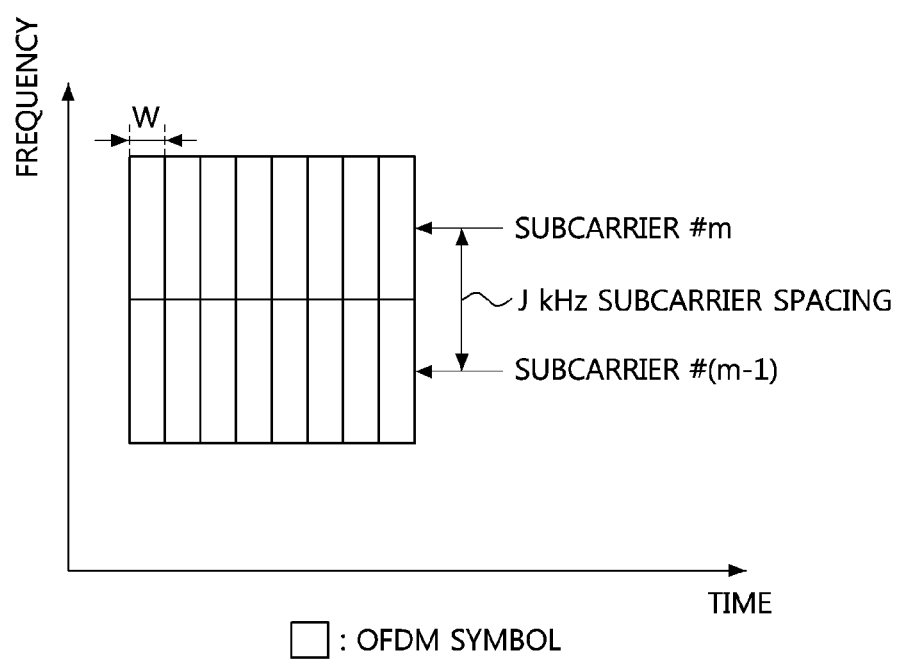
FIG. 9 is a conceptual diagram illustrating a second embodiment of time-frequency resources according to a subcarrier spacing in a wireless communication network.

FIG. 8 is a conceptual diagram illustrating a first embodiment of time-frequency resources according to a subcarrier spacing in a wireless communication network, and FIG. 9 is a conceptual diagram illustrating a second embodiment of time-frequency resources according to a subcarrier spacing in a wireless communication network.

Referring to FIG. 8, in a wireless communication network in which a K kHz subcarrier spacing is used, the length of one OFDM symbol may be S ms. Referring to FIG. 9, in a wireless communication network in which a J kHz subcarrier spacing is used, the length of one OFDM symbol may be W ms. When the subcarrier spacing J kHz is twice the subcarrier spacing K kHz (i.e., J=2K), the length of the OFDM symbol (i.e., W ms) in FIG. 9 may be half the length of the OFDM symbol (i.e., S ms) in FIG. 8. In this case, W=S/2.

In the wireless communication network, the subcarrier spacing may be variably configured. For example, in a wireless communication network in which a 15 kHz subcarrier spacing is used, the length of the OFDM symbol may be $1/15000$ second (s). In this case, the length of one slot composed of 7 OFDM symbols shown in FIG. 6 may be $7/15000$ s.

Figure 10:
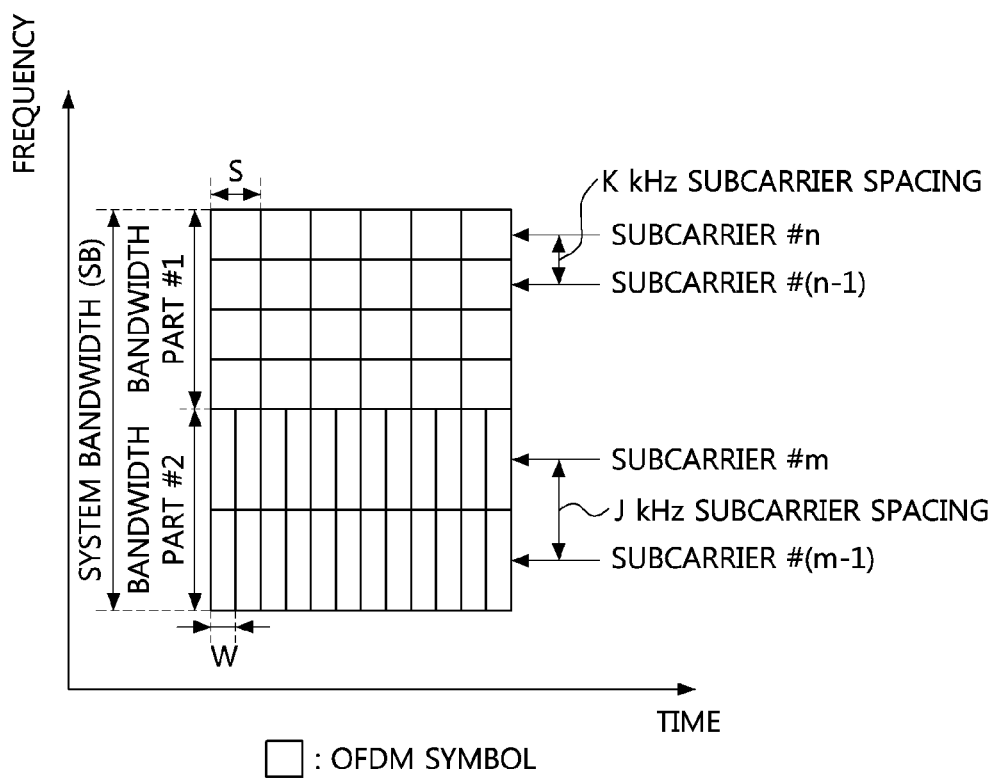
FIG. 10 is a conceptual diagram illustrating a first embodiment of a bandwidth part configuration in a wireless communication network.

FIG. 10 is a conceptual diagram illustrating a first embodiment of a bandwidth part configuration in a wireless communication network.

Referring to FIG. 10, a system bandwidth SB may include one or more bandwidth parts. For example, the system bandwidth SB may include a bandwidth part #1 and a bandwidth part #2. A subcarrier spacing of the bandwidth part #1 may be different from a subcarrier spacing of the bandwidth part #2. The subcarrier spacing of the bandwidth part #1 may be K kHz, in which case the base station and the UE may perform communications based on numerology according to the subcarrier spacing K kHz. The subcarrier spacing of the bandwidth part #2 may be J kHz, in which case the base station and the UE may perform communications based on numerology according to the subcarrier spacing J kHz.

The UE may transmit and receive signals in the entire system bandwidth SB or in some of the system bandwidth (SB) depending on its capability. For example, a UE capable of transmitting and receiving signals in the entire system bandwidth (SB) may be configure to transmit and receive signals in the bandwidth part #1, the bandwidth part #2, or the entire system bandwidth SB (e.g., bandwidth parts #1 and #2). A UE capable of transmitting and receiving signals in some of the system bandwidth SB may be configured to transmit and receive signals in the bandwidth part #1 or the bandwidth part #2.

Figure 11:
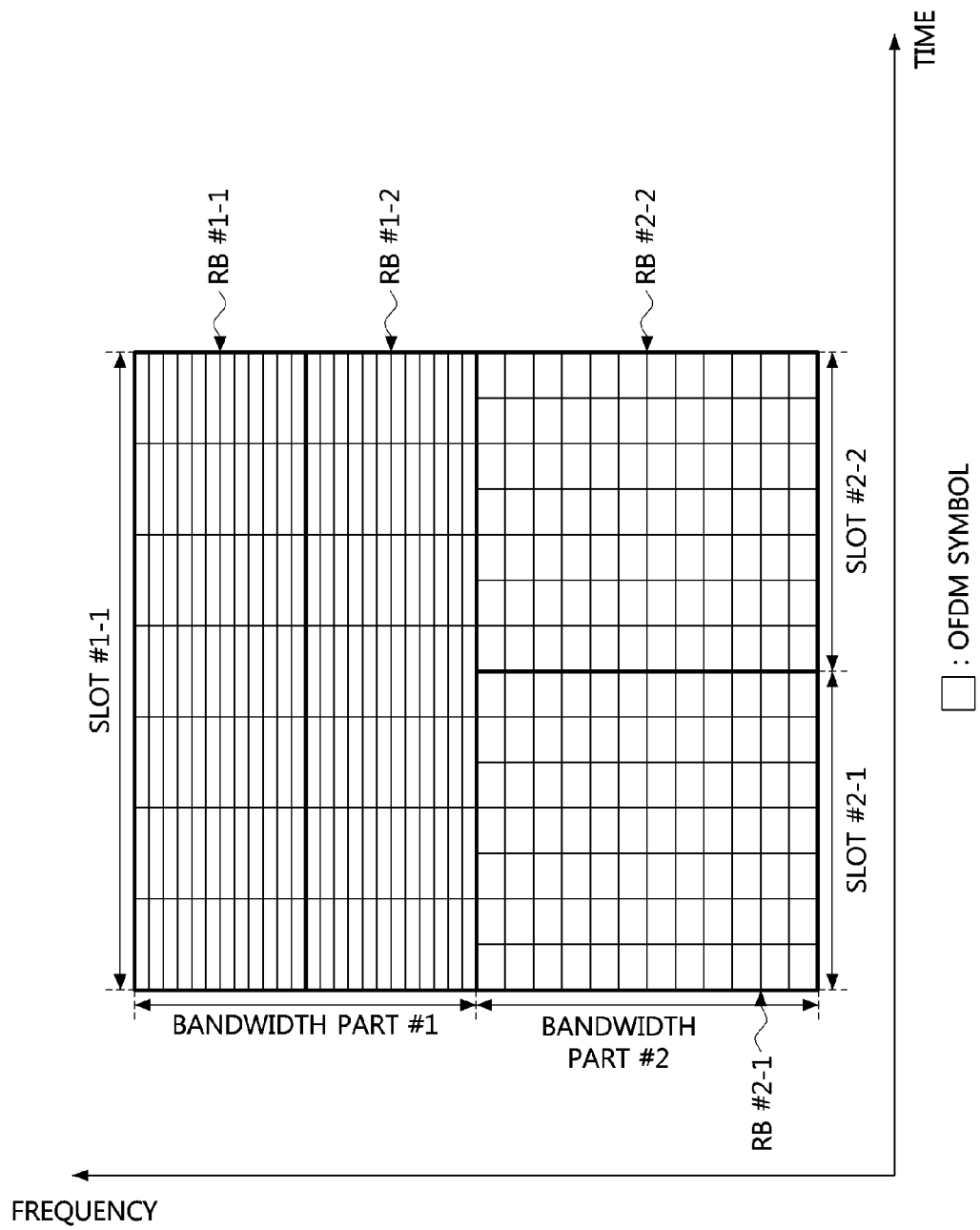
FIG. 11 is a conceptual diagram illustrating a third embodiment of time-frequency resources according to a subcarrier spacing in a wireless communication network.

FIG. 11 is a conceptual diagram illustrating a third embodiment of time-frequency resources according to a subcarrier spacing in a wireless communication network.

Referring to FIG. 11, a subcarrier spacing of a bandwidth part #1 may be different from a subcarrier spacing of a bandwidth part #2. For example, the subcarrier spacing of the bandwidth part #2 may be twice the subcarrier spacing of the bandwidth part #1. The slot may be defined regardless of the subcarrier spacing. For example, one slot may be composed of 7 OFDM symbols regardless of the length of the OFDM symbol. In this case, in the same time period, one slot (e.g., slot #1-1) may be configured in the bandwidth part #1, and two slots (e.g., slot #2-1 and slot #2-2) may be configured in the bandwidth part #2. Also, the RB may be configured with one slot in the time axis and 12 subcarriers in the frequency axis regardless of the subcarrier spacing. In this case, in the same sized time-frequency resources, two RBs (e.g., RB #1-1 and RB #1-2) may be configured in the frequency axis in the bandwidth part #1 and two RBs (e.g., RB #2-1 ad RB #2-2) may be configured in the time axis in the bandwidth part #2.

Next, a method of transmitting and receiving signals between the base station and the UE will be described. Here, the signal may be system information, control information, user data, or the like. The base station may transmit common information for a cell (e.g., a cell formed by the base stations) to UEs in the cell. The common information may be common system information, common control information, and the like. The common information may be transmitted in a broadcasting manner to the UEs in the cell, and accordingly, a channel used for transmitting and receiving the common information may be referred to as a 'physical broadcast channel (PBCH)'. Here, a channel may refer to a physical time-frequency resource. Also, the base station may transmit a synchronization signal together with the PBCH to the UEs in the cell in a broadcasting manner. The synchronization signal may be used to acquire time synchronization, etc. of the cell. A set of the synchronization signal and the PBCH may be referred to as 'synchronization signal (SS) block' or 'SS/PBCH block'. The synchronization signal may include a primary synchronization signal (PSS) and a secondary synchronization signal (SSS), and the SS block may further include a PBCH demodulation reference signal (DMRS) used for demodulating the PBCH.

Figure 12A:
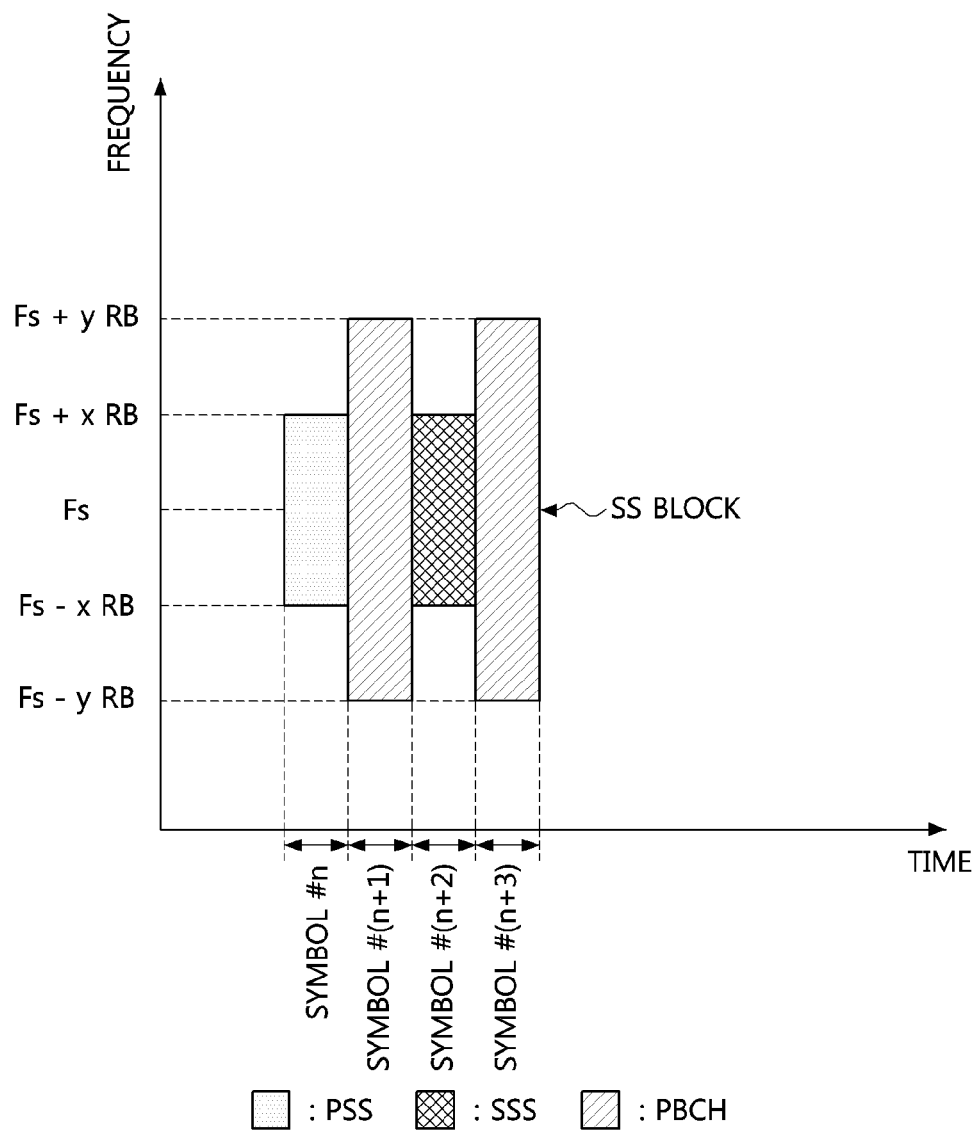
FIG. 12A is a conceptual diagram illustrating a first embodiment of an SS block in a wireless communication network.

FIG. 12A is a conceptual diagram illustrating a first embodiment of an SS block in a wireless communication network.

Referring to FIG. 12A, an SS/PBCH block may comprise 4 OFDM symbols in the time axis. The first symbol (i.e., symbol #n) of the 4 OFDM symbols may be composed of PSS, the second symbol (i.e., symbol #n+1) of the 4 OFDM symbols may be composed of PBCH, the third symbol (i.e., symbol #n+2) of the 4 OFDM symbols may be composed of SSS, and the fourth symbol (i.e., symbol #n+3) of the 4 OFDM symbols may be composed of PBCH. Each of the PSS and SSS may be a specific sequence and may be used for acquisition of synchronization and cell information at the UE. The PBCH may be used to convey cell related information.

Figure 12B:
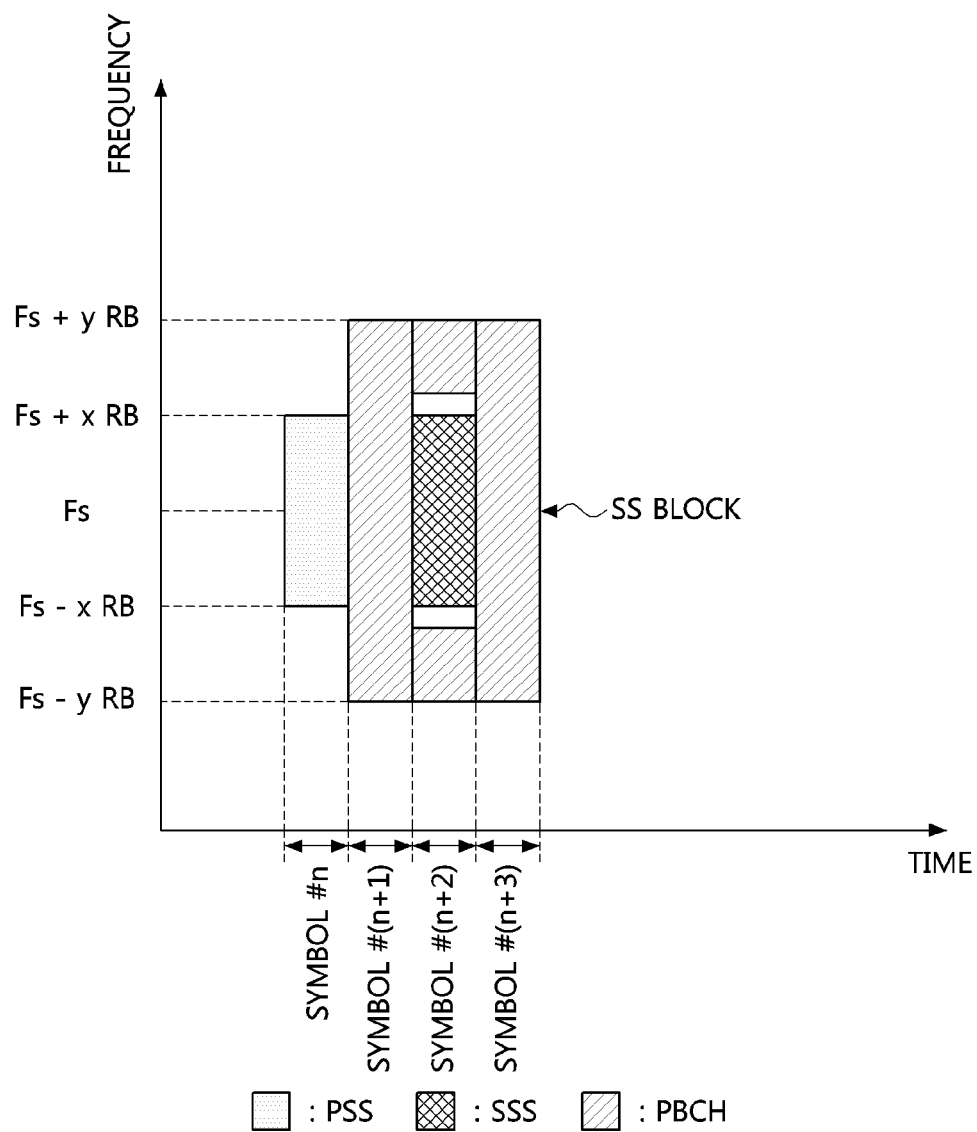
FIG. 12B is a conceptual diagram illustrating a second embodiment of an SS block in a wireless communication network.

FIG. 12B is a conceptual diagram illustrating a second embodiment of an SS block in a wireless communication network.

Referring to FIG. 12B, an SS/PBCH block may comprise 4 OFDM symbols in the time axis. The first symbol (i.e., symbol #n) of the 4 OFDM symbols may be composed of PSS, the second symbol (i.e., symbol #n+1) of the 4 OFDM symbols may be composed of PBCH, the third symbol (i.e., symbol #n+2) of the 4 OFDM symbols may be composed of SSS and PBCH, and the fourth symbol (i.e., symbol #n+3) of the 4 OFDM symbols may be composed of PBCH.

The size of each of the PSS and SSS in the frequency axis may be 2x RBs centered on a center frequency Fs of the SS/PBCH block. Here, x may be 6. The size of the PBCH in the frequency axis may be 2y RBs centered on the center frequency Fs of the SS/PBCH block. Here, y may be 12. When one RB is composed of 12 subcarriers, each of the PSS and SSS may be transmitted in 144 subcarriers. When indexes of 144 subcarriers are set to #0 to #143, each of the PSS and the SSS may be actually transmitted in the subcarriers #8 to #134 (i.e., 127 subcarriers). In this case, signals (e.g., PSS or SSS) may not be transmitted in the remaining 17 subcarriers (i.e., subcarriers #0 to #7 and subcarriers #135 to #143).

Meanwhile, the center frequency Fs of the frequency band in which the SS block is transmitted may be predefined. In this case, the base station may transmit the SS block based on the predefined center frequency Fs. Also, a subcarrier spacing used for transmission of the SS block may be predefined. Alternatively, the center frequency Fs of the frequency band in which the SS block is transmitted may be predefined, and the base station may variably configure the subcarrier spacing in the corresponding frequency band, and may transmit the SS block based on the configured subcarrier spacing.

On the other hand, in the embodiment shown in FIG. 11, when the subcarrier spacing is configured differently for each bandwidth part, the SS block may be transmitted according to the center frequency of each of the bandwidth parts. The subcarrier spacing of the SS block may be the same as the subcarrier spacing of the bandwidth part in which the SS block is transmitted. That is, the SS block may be transmitted according to the subcarrier spacing of the corresponding bandwidth part. Alternatively, when the center frequency of the frequency band in which the SS block is transmitted is predefined, the SS block may be transmitted according to the subcarrier spacing of the bandwidth part in which the center frequency is located.

Alternatively, in the embodiment shown in FIG. 11, when the subcarrier spacing is configured differently for each bandwidth part, the base station may transmit the SS block in each of the bandwidth parts. In this case, the SS block may be transmitted according to the subcarrier spacing of the corresponding bandwidth part. Meanwhile, the base station may assign a different cell identifier (ID) to each of the bandwidth parts. In this case, an initial value used for generating the SS block may differ depending on the bandwidth part. For example, when a cell ID of the bandwidth part #1 is defined as 'cell ID #n', the base station may use an initial value n1 to generate the SS block for the bandwidth part #1. When a cell ID of the bandwidth part #2 is defined as 'cell ID #m', the base station may use an initial value m1 to generate the SS block for the bandwidth part #2. In this case, the UE may recognize each of the bandwidth parts assigned different cell IDs as a different cell.

Alternatively, the base station may assign the same cell ID to different bandwidth parts. In this case, the base station may generate the SS block using the same initial value in a plurality of bandwidth parts. For example, in the embodiment shown in FIG. 11, when the cell ID of the bandwidth part #1 is defined as 'cell ID #n' and the cell ID of the bandwidth part #2 is defined as 'cell ID #m', the base station may generated the SS blocks for the bandwidth parts #1 and #2 by using the initial value n1. In this case, the UE may recognize the bandwidth parts assigned the same cell ID as the same cell.

Meanwhile, in the bandwidth parts having the same cell ID, parameters (e.g., SS block index) according to the subcarrier spacing excluding the cell ID may be configured according to the subcarrier spacing of the corresponding bandwidth part. When the same cell ID is assigned to the bandwidth parts #1 and #2, the SS block including PSS, SSS, and PBCH (e.g., PBCH and PBCH DMRS) may be generated using the same cell ID. However, in the bandwidth parts #1 and #2, the subcarrier spacing of the SS block may be different according to the bandwidth part, and a transmission position of the SS block may be different according to the bandwidth part. For example, initial values used for an SS block index indicated by the PBCH of the SS block, the PBCH DMRS, and scrambling of the PBCH may be different for each of the bandwidth parts.

Alternatively, the base station may transmit a plurality of SS blocks in one bandwidth part, and the plurality of SS blocks may be transmitted as multiplexed in the frequency axis of the one bandwidth part. In the embodiment shown in FIG. 11, the base station may transmit a plurality of SS blocks in the bandwidth part #1. Here, the plurality of SS blocks may be transmitted using the same time resource or different time resources. The SS blocks transmitted according to different center frequencies may be generated based on the same cell ID. The signals (e.g., PSS, SSS, PBCH) included in the SS block may be generated based on the same SS block index. Each of the SS blocks transmitted through different frequencies in one bandwidth part may be classified into a cell-defining SS block and a measurement SS block. The cell-defining SS block may be used for synchronization, channel estimation, transmission of common information of the cell, etc. in the bandwidth part in which the cell-defining SS block is transmitted. The measurement SS block may be used for channel quality measurement etc. in the frequency band in which the measurement SS block is transmitted. The base station may inform the UE of the type of the SS block (e.g., cell-defining SS block or measurement SS block).

Meanwhile, since the PBCH does not have a sequence form such as the synchronization signal (e.g., PSS and SSS), a reference signal (e.g., PBCH DMRS) for channel estimation or the like may be required. The PBCH DMRS may be transmitted in some of 4z subcarriers allocated for the PBCH. Here, z may be an integer equal to or greater than 1. For example, when the size of the PBCH in the frequency axis is 24 RBs, z may be 72. When an allocation ratio of the PBCH DMRS in the frequency axis is ¼, the PBCH DMRS may be transmitted in z subcarriers among 4z subcarriers, and the PBCH (e.g., PBCH payload or PBCH data) may be transmitted in the remaining 3z subcarriers.

On the other hand, the PBCH DMRS may be defined in form of a modulated sequence, and a base sequence (reference sequence) used for generating the sequence of the PBCH DMRS may be defined based on Equation 1.

$$c(n) = (x_1(n+e_1) + x_2(n+e_z)) \bmod 2 \qquad \text{[Equation 1]}$$

$c(n)$ may be a base sequence, $x_1(n)$ and $x_2(n)$ may be subsequences used to define the base sequence $c(n)$, $e_1$ may be an index off for $x_1(n)$, and $e_2$ may be an index offset for $x_2(n)$. $e_1$ may be equal to $e_2$. The base sequence $c(n)$ and the subsequences $x_1(n)$ and $x_2(n)$ may be binary sequences consisting of 0 and 1. $x_1(n)$ constituting the base sequence $c(n)$ may be defined based on Equation 2.

$$x_1(n+M_1) = \left(\sum_{k \in S_1} x_1(n+k)\right) \bmod 2 \qquad \text{[Equation 2]}$$

$M_1$ may indicate the length of the sequence, which is an initial value. In Equation 2, when $x_1(n)$ is defined for $n=0, \ldots,$ and $M_1-1$, the initial value may be defined. When $n$ is defined as $M_1, M_1+1, \ldots,$ or the like, the sequence may be calculated based on Equation 2. $S_1$ may be defined as an arbitrary set comprising integers from 0 to $M_1-1$. $S_1$ should include 0. k∈S$_1$ may denote k belonging to S$_1$. When S$_1$ is defined {0, 4}, x$_1$(n) may be defined based on Equation 3.

$$x_1(n+M_1)=(x_1(n)+x_1(n+4)) \mod 2 \quad [\text{Equation 3}]$$

X$_2$(n) constituting the base sequence c(n) may be defined based on Equation 4.

$$x_2(n+M_2) = \left(\sum_{k \in S_2} x_2(n+k)\right) \mod 2 \quad [\text{Equation 4}]$$

M$_2$ may indicate the length of the sequence, which is an initial value. S$_2$ may be defined as an arbitrary set comprising integers from 0 to M$_2$−1. S$_2$ should include 0. When S$_2$ is defined {0, 1}, x$_2$(n) may be defined based on Equation 5.

$$x_2(n+M_1)=(x_2(n)+x_2(n+1)) \mod 2 \quad [\text{Equation 5}]$$

An initial sequence used for generating x$_1$(n) may be defined based on Equation 6.

$$x_1(n) = \left\lfloor \frac{c_{init1}}{2^n} \right\rfloor \mod 2, n = 0, \ldots, M_1 - 1 \quad [\text{Equation 6}]$$

c$_{init1}$ may be an initial value used for generating an initial sequence of x$_1$(n). An initial sequence used for generating x$_2$(n) may be defined based on Equation 7.

$$x_2(n) = \left\lfloor \frac{c_{init2}}{2^n} \right\rfloor \mod 2, n = 0, \ldots, M_2 - 1 \quad [\text{Equation 7}]$$

c$_{init2}$ may be an initial value used for generating an initial sequence of x$_2$(n). The PBCH DMRS may be generated using the base sequence (i.e., the base sequence according to Equation 1) generated based on Equations 2, 4, 6, and 7. The PBCH DMRS may be modulated based on a binary phase shift keying (BPSK) scheme. In this case, the modulated PBCH DMRS may be defined based on Equation 8.

$$r(n)=1-2c(n), n=0, \ldots, P \quad [\text{Equation 8}]$$

r(n) may indicate the modulated PBCH DMRS, c(n) may be equal to the c(n) defined in Equation 1, P may indicate the number of REs in which the PBCH DMRS is transmitted in the SS block.

Alternatively, the PBCH DMRS may be modulated based on a quadrature phase shift keying (QPSK) scheme. In this case, the modulated PBCH DMRS may be defined based on Equation 9.

$$r(n) = \frac{1}{\sqrt{2}}(1 - 2c(2n)) + j\frac{1}{\sqrt{2}}(1 - 2c(2n+1)),$$
$$n = 0, \ldots, P \quad [\text{Equation 9}]$$

r(n) may indicate the modulated PBCH DMRS, c(n) may be equal to the c(n) defined in Equation 1, P may indicate the number of REs in which the PBCH DMRS is transmitted in the SS block.

The sequence of the PBCH DMRS may vary depending on the type of information (e.g., information included in the PBCH demodulated by the PBCH DMRS) that the base station desires to transmit to the UE. In this case, the base station may inform the UE that the information mapped to the sequence of the PBCH DMRS is transmitted by transmitting the PBCH DMRS. The UE may receive the PBCH DMRS from the base station, and may identify the type of information (e.g., information included in the PBCH demodulated by the PBCH DMRS) transmitted to the UE by the base station based on the sequence of the PBCH DMRS.

Referring to Equation 1, c(i) may be changed according to c$_{init1}$ which is the initial value of x$_1$(n) and c$_{init2}$ which is an initial value of x$_2$(n) defined in Equations 2 to 7. Therefore, the base station may determine c$_{init1}$ and c$_{init2}$ according to the information to be transmitted to the UE, and may generate the base sequence defined in Equation 1 based on the information. The base station may generate the PBCH DMRS using the generated base sequence, and inform the UE that the information mapped to the sequence of the corresponding PBCH DMRS is transmitted by transmitting the PBCH DMRS.

Next, transmission positions of the PBCH DMRS will be described. The PBCH DMRS may be used for channel estimation for demodulation of the PBCH (e.g., PBCH payload or PBCH data). The PBCH DMRS may be multiplexed with the PBCH in a transmission region of the PBCH in the SS block. For example, the PBCH DMRS may be multiplexed with the PBCH in the frequency axis. In this case, the PBCH DMRS may be arranged at equal intervals in the frequency axis of the transmission region of the PBCH.

Figure 13A:
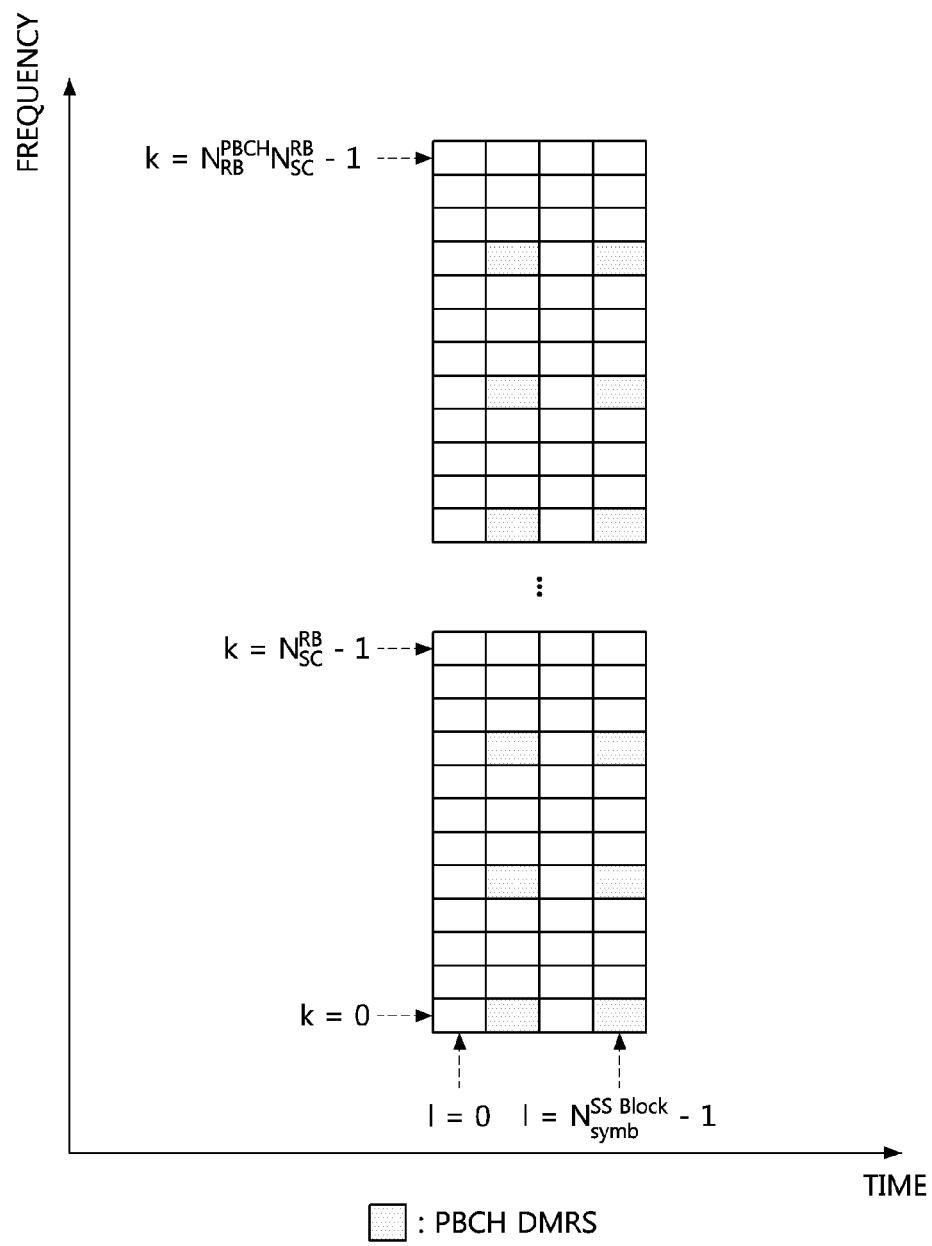
FIG. 13A is a conceptual diagram illustrating a first embodiment of transmission positions of a PBCH DMRS in a wireless communication network.

FIG. 13A is a conceptual diagram illustrating a first embodiment of transmission positions of a PBCH DMRS in a wireless communication network.

Referring to FIG. 13A, time-frequency resources may indicate time-frequency resources to which one SS block is allocated. In the time axis, the number of OFDM symbols constituting one SS block may be defined as $N_{symb}^{SS\ Block}$. For example, $N_{symb}^{SS\ Block}$ may be 4. The OFDM symbol index (l) in one SS block may be set to 0, 1, 2, or 3. In this case, l set to '0' may indicate the first OFDM symbol in the SS block, l set to '1' may indicate the second OFDM symbol in the SS block, l set to '2' may indicate the third OFDM symbol in the SS block, and l set to '3' may indicate the fourth OFDM symbol in the SS block. l may be independent of the OFDM symbol index in the slot.

In the frequency axis, the number of RBs constituting a PBCH in one SS block may be defined as $N_{RB}^{PBCH}$. For example, $N_{RB}^{PBCH}$ may be 24. In the frequency axis, the number of subcarriers constituting one RB may be defined as $N_{SC}^{RB}$. For example, $N_{SC}^{RB}$ may be 12. In the frequency axis, the PBCH of one SS block may include $N_{RB}^{PBCH} \cdot N_{SC}^{RB}$ subcarriers. In one SS block, a subcarrier index of the PBCH may be defined as k, and k may be defined as 0, 1, . . . , $N_{RB}^{PBCH} \cdot N_{SC}^{RB} - 1$. In this case, k set to '0' may indicate the first subcarrier in the PBCH. The subcarrier index may be given in the order of low frequency to high frequency. k may be independent of the subcarrier index in the system bandwidth.

The PBCH DMRS generated based on Equation 8 or 9 may be mapped to REs in the transmission region of the PBCH. First, the density of the PBCH DMRS in the PBCH may be determined.

The number of subcarriers in which the PBCH DMRS is transmitted may be defined as $N_{DMRS}^{RB}$ among $N_{SC}^{RB}$ subcarriers. $N_{DMRS}^{RB}$ may be one of 0 to $N_{SC}^{RB}$. For example, $N_{DMRS}^{RB}$ may be 3. In this case, the PBCH DMRS may be transmitted using 3 subcarriers among 12 subcarriers constituting one RB in one symbol. The PBCH (e.g., PBCH payload or PBCH data) may be transmitted in the remaining 9 subcarriers. The PBCH DMRS may be evenly distributed within 12 subcarriers.

When the $N_{DMRS}^{RB}$ subcarriers of the PBCH DMRS are evenly distributed within the $N_{SC}^{RB}$ subcarriers in one RB, an interval d between the subcarriers in which the PBCH DMRS is located may be defined based on Equation 10.

$$d = N_{SC}^{RB}/N_{DMRS}^{RB} \quad \text{[Equation 10]}$$

The PBCH DMRS $(\alpha_{k,l})$ transmitted in the subcarrier index k and the OFDM symbol index 1 may be defined based on Equation 11.

$$\alpha_{k,l} = r(l' \cdot N_{DMRS}^{RB} N_{RB}^{PBCH} + m') \quad \text{[Equation 11]}$$

The subcarrier index k in which the PBCH DMRS is transmitted in Equation 11 may be defined based on Equation 12.

$$k = d \cdot m' + \varepsilon \quad \text{[Equation 12]}$$

d may be d defined in Equation 10. ε may indicate the offset of the subcarrier in which the PBCH DMRS is transmitted, and may have a value from 0 to d (e.g., d defined in Equation 10). ε may be predefined. Alternatively, ε may be variably configured according to the cell ID as shown in Equation 13. According to Equation 13, the offset ε of the transmission position of the PBCH DMRS according to the cell ID in the frequency axis may be determined.

$$\varepsilon = \text{cell ID (mod)} d \quad \text{[Equation 13]}$$

m' in Equation 12 may be defined based on Equation 14.

$$m' = 0, 1, \ldots, N_{RB}^{PBCH} N_{DMRS}^{RB} - 1 \quad \text{[Equation 14]}$$

The OFDM symbol index 1 in which the PBCH DMRS is transmitted in Equation 11 may be defined based on Equation 15.

$$l = \begin{cases} 1, & l' = 0 \\ 3, & l' = 1 \end{cases} \quad \text{[Equation 15]}$$

l' may be indices of 2 OFDM symbols to which the PBCH is allocated in the SS block. In the time axis, the index of the first OFDM symbol of the 2 OFDM symbols may be defined as 'l'=0', and the index of the second OFDM symbol of the 2 OFDM symbols may be defined as 'l'=1'.

Figure 13B:
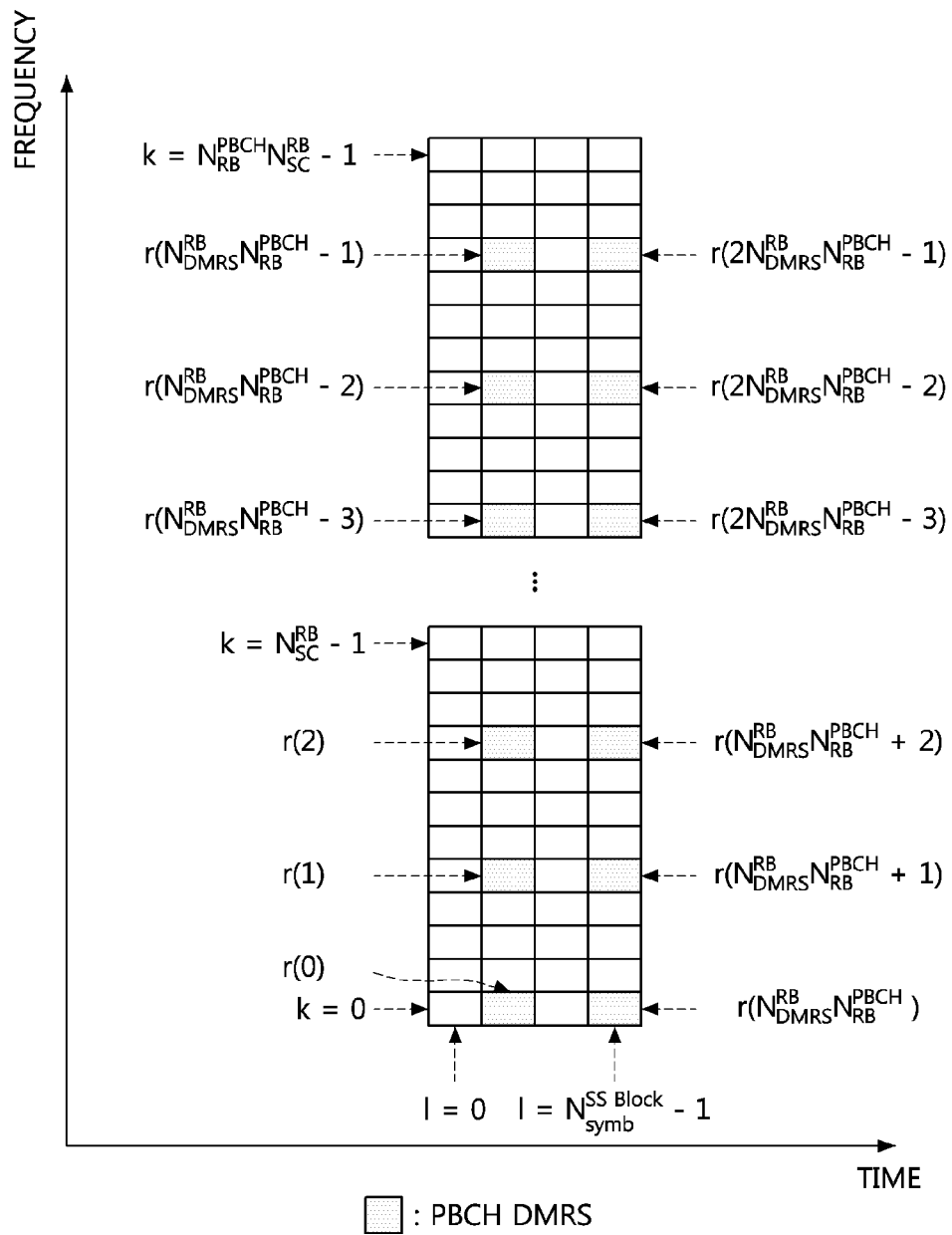
FIG. 13B is a conceptual diagram illustrating a second embodiment of transmission positions of a PBCH DMRS in a wireless communication network.

FIG. 13B is a conceptual diagram illustrating a second embodiment of transmission positions of a PBCH DMRS in a wireless communication network.

Referring to FIG. 13B, the PBCH DMRS may be the PBCH DMRS defined in Equation 11. Here, $N_{DMRS}^{RB}$ may be 3, and ε may be 0. The PBCH DMRS (r(n), n=0, 1, ..., $2N_{DMRS}^{RB}N_{RB}^{PBCH}-1$) generated based on Equation 8 or 9 may be arranged in the order of low frequency to high frequency in the first OFDM symbol among the 2 OFDM symbols to which the PBCH is allocated. Thereafter, the PBCH DMRS may be arranged in the order of low frequency to high frequency in the second OFDM symbol of the 2 OFDM symbols to which the PBCH is allocated.

On the other hand, the PBCH may be scrambled based on different sequences, so that additional information as well as the information included in the PBCH can be transmitted. For example, PBCH b(i)) may be scrambled by a scrambling sequence c(i) as shown in Equation 16, and a result α(i) may be generated. The base station may transmit α(i) through the PBCH.

$$\alpha(i) = (b(i) + c(i)) \bmod 2, i = 0, \ldots, U \quad \text{[Equation 16]}$$

c(i) may be equal to c(i) defined in Equation 1, and U may indicate the length of the PBCH. The base station may transmit additional information to the UE using c(i) used for scrambling the PBCH. The UE may receive an SS block from the base station, obtain the PBCH from the SS block, and obtain the additional information using c(i) used for scrambling the PBCH. c(i) defined in Equation 1 may be changed according to the initial value $c_{init1}$ of $x_1(n)$ and the initial value $c_{init2}$ of $x_2(n)$ defined in Equations 2 to 7. The base station may determine $c_{init1}$ and $c_{init2}$ according to the type of information to be transmitted to the UE, perform scrambling on the PBCH using the scrambling sequence c(i) generated based on the determined $c_{init1}$ and $c_{init2}$, and transmit the scrambled PBCH. The base station may transmit the additional information to the UE by transmitting the scrambled PBCH. The base station may transmit the additional information by configuring an offset for the index i of c(i).

Next, SFN indicating methods in the wireless communication network will be described. As in the embodiment shown in FIG. 3, SFNs #0 to #1023 may be defined. The base station may inform the UE of an SFN in which the corresponding PBCH (e.g., the SS block including the PBCH) is transmitted by transmitting the SS block including the PBCH. The base station may generate information of 10 bits by converting the SFN into a binary form, and may transmit the generated information to the UE. For example, the base station may transmit 10 bits indicating the SFN in the PBCH. In this case, the UE may identify the SFN by demodulating the PBCH.

Alternatively, the base station may transmit some bits of the 10 bits indicating the SFN in the PBCH and transmit the remaining bits using a scrambling sequence of the PBCH. For example, the base station may transmit X bits that are most significant bits (MSBs) among the 10 bits indicating the SFN through the PBCH, and transmit the remaining Y bits (e.g., (10-X) bits) that are least significant bits (LSBs) among the 10 bits indicating the SFN by using the scrambling sequence of the PBCH. Among the 10 bits indicating the SFN, the information transmitted through the PBCH may be defined as 'SFN part #1', and the information transmitted using the scrambling sequence of the PBCH may be defined as 'SFN part #2'. The SFN part #1 may be 7 bits, and the SFN part #2 may be 3 bits. Alternatively, the SFN part #1 may be 6 bits, and the SFN part #2 may be 2 bits.

In order to transmit the SFN part #2 using the scrambling sequence of the PBCH, an initial value used for generating the scrambling sequence of the PBCH may be generated based on the SFN part #2. For example, c(i) in Equation 16 may be the scrambling sequence generated based on Equations 1 to 7, and the base station may scramble the PBCH using the scrambling sequence generated based on Equations 1 to 7. In order to transmit the SFN part #2, the initial values ($c_{init1}$ and $c_{init2}$) of the subsequences of Equations 6 and 7 may be determined based on the SFN part #2.

For example, $c_{init1}$ may be determined based on the SFN part #2, in which case $c_{init2}$ may be determined independently of the SFN part #2. Alternatively, $c_{init2}$ may be determined based on the SFN part #2, in which case $c_{init1}$ may be determined independently of the SFN part #2. Alternatively, $c_{init1}$ and $c_{init2}$ may be determined based on the SFN part #2.

In another embodiment, a part of the SFN part #2 may be used to determine $c_{init1}$ and the remaining part of the SFN part #2 may be used to determine $c_{init2}$. For example, when the SFN part #2 is composed of 3 bits, one bit of the SFN part #2 may be used to determine $c_{init1}$, and 2 bits of the SFN part #2 may be used to determine $c_{init2}$. Alternatively, when the SFN part #2 is composed of 3 bits, 2 bits of the SFN part

2 may be used to determine $c_{init1}$, and one bit of the SFN part #2 may be used to determine $c_{init2}$.

In another embodiment, the initial value of the scrambling sequence of the PBCH may be determined based on the SFN part #2 and the cell ID. For example, the initial value $c_{init1}$ of $x_1(n)$ may be determined based on the cell ID, and the initial value $c_{init2}$ of $x_2(n)$ may be determined based on the SFN part #2. Alternatively, the initial value $c_{init1}$ of $x_1(n)$ may be determined based on the SFN part #2, and the initial value $c_{init2}$ of $x_2(n)$ may be determined based on the cell ID.

In another embodiment, at least one of the initial value $c_{init1}$ of $x_1(n)$ and the initial value $c_{init2}$ of $x_2(n)$ may be determined based on a value generated by a combination of the cell ID and the SFN part #2. When the initial value $c_{init1}$ of $x_1(n)$ is determined based on the value generated by the combination of the cell ID and the SFN part #2, the initial value $c_{init2}$ of $x_2(n)$ may be set to a predefined value. When the initial value $c_{init2}$ of $x_2(n)$ is determined bed on the value generated by a combination of the cell ID and the SFN part #2, the initial value $c_{init1}$ of $x_1(n)$ may be set to a predefined value.

Next, a position in which the SS block can be transmitted (e.g., a candidate transmission position) in the subframe will be described. One subframe may have a length of 1 ms. As in the embodiments shown in FIGS. 10 and 11, the subcarrier spacing may be variably configured, and the length of the OFDM symbol may vary according to the subcarrier spacing. Accordingly, the number of OFDM symbols in the subframe may vary according to the subcarrier spacing. As a result, the SS block transmittable positions and the number of transmittable SS blocks may vary depending on the subcarrier spacing.

When a 15 kHz subcarrier spacing is used, a SS block basic unit may be defined as one subframe or one slot. The SS block basic unit may be a basic unit defining SS block transmittable positions, and the SS block transmittable positions may be the same for each SS block basic unit. For example, when the SS block basic unit is defined as one subframe, the SS block transmittable positions may be the same for each subframe. When one system frame is composed of 10 subframes, the SS block transmittable positions in the 10 subframes included in one system frame may be the same as the positions defined in the SS block basic unit. The same SS block basic unit may be repeated 10 times within one system frame.

When the SS block basic unit is defined as a ¼ subframe, the SS block transmittable positions may be the same in each ¼ subframe. Therefore, there may be 4 SS block basic units in one subframe, and the same SS block basic unit may be repeated 4 times in one subframe.

The SS block may or may not be transmitted in the SS block transmittable positions. In the following embodiments, the SS block transmittable position may be referred to as a 'candidate SS block'.

Figure 14:
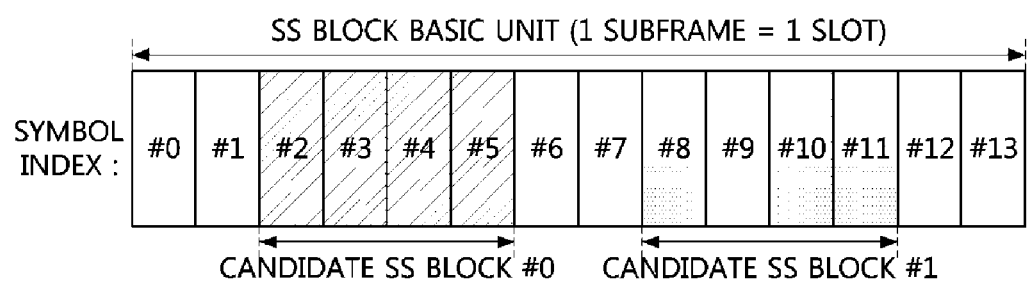
FIG. 14 is a conceptual diagram illustrating a first embodiment of SS block transmittable positions (e.g., candidate SS blocks) in a wireless communication network.

FIG. 14 is a conceptual diagram illustrating a first embodiment of SS block transmittable positions (e.g., candidate SS blocks) in a wireless communication network.

Referring to FIG. 14, when a 15 kHz subcarrier spacing is used, an SS block basic unit may be defined as one subframe or one slot. One subframe or one slot having a length of 1 ms may comprise 14 OFDM symbols (OFDM symbols #0 to #13). The OFDM symbols #0 to #1 may be used for downlink transmission, the OFDM symbols #2 to #5 may be used for SS block transmission, the OFDM symbols #6 to #7 may be used for guard period (GP), downlink transmission, or uplink transmission, the OFDM symbols #8 to #11 may be used for SS block transmission, and the OFDM symbols #12 to #13 may be used for GP, downlink transmission, or uplink transmission. Symbols of the same size may be configured for GP, downlink transmission, or uplink transmission in a starting region, a middle region, and an ending region of the subframe or slot, and the SS block may be transmitted in the remaining symbols.

When one subframe or one slot in which the SS block basic unit is defined includes K OFDM symbols, the positions in which the SS block is not transmitted may be a first symbol, a second symbol, a (K/2-1)-th symbol, a (K/2)-th symbol, a (K-2)-th symbol, and a (K-1)-th symbol. The SS block may be transmitted using the remaining OFDM symbols not belonging to the positions in which the SS block is not transmitted in one subframe or one slot. When one subframe or one slot in which the SS block basic unit is defined includes K OFDM symbols, the index of the starting OFDM symbol of the candidate SS block may be defined based on Equation 17.

$$j = i \times 6 + 2 \qquad \text{[Equation 17]}$$

j may indicate the starting OFDM symbol index, and i may have a value from 0 to n. n may be defined based on Equation 18.

$$n = \lfloor K/6 \rfloor - 1 \qquad \text{[Equation 18]}$$

K may indicate the number of OFDM symbols included in one subframe or one slot. $\lfloor K/6 \rfloor$ may be the greatest natural number (or, the greatest integer) smaller than a solution of (K/6).

When the position of the starting OFDM symbol of the candidate SS block is $\alpha_{k,j}$, the subcarrier index and the OFDM symbol index in Equation 11 may be defined as k and l, respectively. When the position of the first OFDM symbol of the slot is $\alpha_{k,0}$, considering the position of the OFDM symbol of the candidate SS block, the position in which the PBCH DMRS is transmitted based on the starting point of the slot may be defined based on Equation 19.

$$\alpha_{k,l+j} = r(l'_{DMRS} N_{RB}^{RB} N_{RB}^{PBCH} + m') \qquad \text{[Equation 19]}$$

Figure 15:
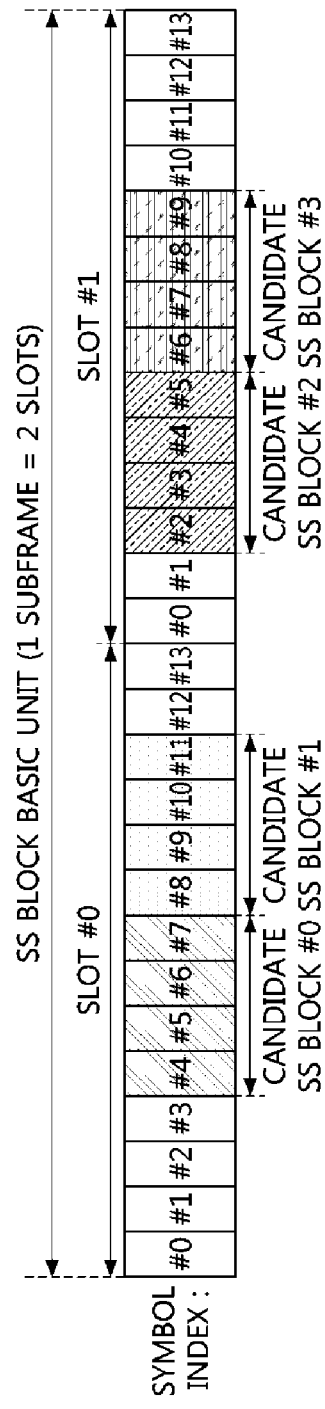
FIG. 15 is a conceptual diagram illustrating a second embodiment of SS block transmittable positions (e.g., candidate SS blocks) in a wireless communication network.

FIG. 15 is a conceptual diagram illustrating a second embodiment of SS block transmittable positions (e.g., candidate SS blocks) in a wireless communication network.

Referring to FIG. 15, when a 30 kHz subcarrier spacing is used, an SS block basic unit may be defined as one subframe or 2 slots. One subframe having a length of 1 ms may comprise 28 OFDM symbols and each of the 2 slots may comprise 14 OFDM symbols.

The OFDM symbols #0 to #3 of the slot #0 may be used for downlink transmission, the OFDM symbols #4 to #7 of the slot #0 may be used for transmission of one SS block, the OFDM symbols #8 to #11 of the slot #0 may be used for transmission of one SS block, and the OFDM symbols #12 to #13 of the slot #0 may be used for GP, downlink transmission, or uplink transmission. The OFDM symbols #0 to #1 of the slot #1 may be used for GP, downlink transmission, or uplink transmission, the OFDM symbols #2 to #5 of the slot #1 may be used for transmission of one SS block, the OFDM symbols #6 to #9 of the slot #1 may be used for transmission of one SS block, and the OFDM symbols #10 to #13 of the slot #1 may be used for GP, downlink transmission, or uplink transmission. The transmission of SS block may be restricted in the symbols allocated for GP, downlink transmission, or uplink transmission.

Similarly to the embodiment shown in FIG. 14, symbols of the same size may be configured for GP, downlink transmission, or uplink transmission may be configured in a starting region, a middle region, and an ending region of the subframe, and the SS block may be transmitted in the remaining symbols. Since the length of an OFDM symbol when a 30 kHz subcarrier spacing is used is one half the length of an OFDM symbol when a 15 kHz subcarrier spacing is used, in order to configure the length of the OFDM symbols used for GP, downlink transmission, or uplink transmission equally in the time axis, 4 OFDM symbols of a 30 kHz subcarrier spacing, which are used for GP, downlink transmission or uplink transmission, may be configured as corresponding to 2 OFDM symbols of a 15 kHz subcarrier spacing, which are used for GP, downlink transmission or uplink transmission.

In the wireless communication network in which a 30 kHz subcarrier spacing is used, the OFDM symbols #0 to #3 and #12 to #13 in slots satisfying 'slot number (mod) 2=0' may be used for GP, downlink, or uplink transmission. The transmission of SS block may be restricted in the OFDM symbols #0 to #3 and #12 to #13 in the corresponding slot. In the wireless communication network in which a 30 kHz subcarrier spacing is used, the OFDM symbols #0 to #1 and #10 to #13 in slots satisfying 'slot number (mod) 2=1' may be used for GP, downlink, or uplink transmission. The transmission of SS block may be restricted in the OFDM symbols #0 to #1 and #10 to #13 in the corresponding slot.

When one subframe includes M OFDM symbols and one slot includes K(=M/2) OFDM symbols, the positions in which the SS block is not transmitted may be represented as follows. The transmission of SS block may be restricted in the first symbol, the second OFDM symbol, the (K−2)-th OFDM symbol, and the (K−1)-th OFDM symbol in slots satisfying 'slot number (mod) 2=0' or 'slot number (mod) 2=1'. The transmission of SS block may be restricted in the OFDM symbols #2 to #3 in slots satisfying 'slot number (mod) 2=0'. The transmission of SS block may be restricted in the OFDM symbols #10 to #11 in slots satisfying 'slot number (mod) 2=1'. The SS block may be transmitted in the remaining OFDM symbols except the above-described OFDM symbols in which the transmission of SS block is restricted.

When one subframe includes M OFDM symbols and one slot includes K(=M/2) OFDM symbols, the starting OFDM symbol index of the candidate SS block in slots satisfying 'slot number (mod) 2=0' may be defined based on Equation 20.

$$j = i \times 4 + 4 \quad \text{[Equation 20]}$$

j may indicate the starting OFDM symbol index, and i may have a value from 0 to n. n may be defined based on Equation 21.

$$n = \lfloor K/4 \rfloor - 2 \quad \text{[Equation 21]}$$

K may indicate the number of OFDM symbols included in one slot, and $\lfloor K/4 \rfloor$ may be the greatest natural number (or, the greatest integer) smaller than a solution of (K/4).

When one subframe includes M OFDM symbols and one slot includes K(=M/2) OFDM symbols, the starting OFDM symbol index of the candidate SS block in slots satisfying 'slot number (mod) 2=1' may be defined based on Equation 22.

$$j = i \times 4 + 2 \quad \text{[Equation 22]}$$

j may indicate the starting OFDM symbol index, and i may have a value from 0 to n. n may be defined based on Equation 23.

$$n = \lfloor K/4 \rfloor - 2 \quad \text{[Equation 23]}$$

K may indicate the number of OFDM symbols included in one slot, and $\lfloor K/4 \rfloor$ may be the greatest natural number (or, the greatest integer) smaller than a solution of (K/4).

Figure 16:
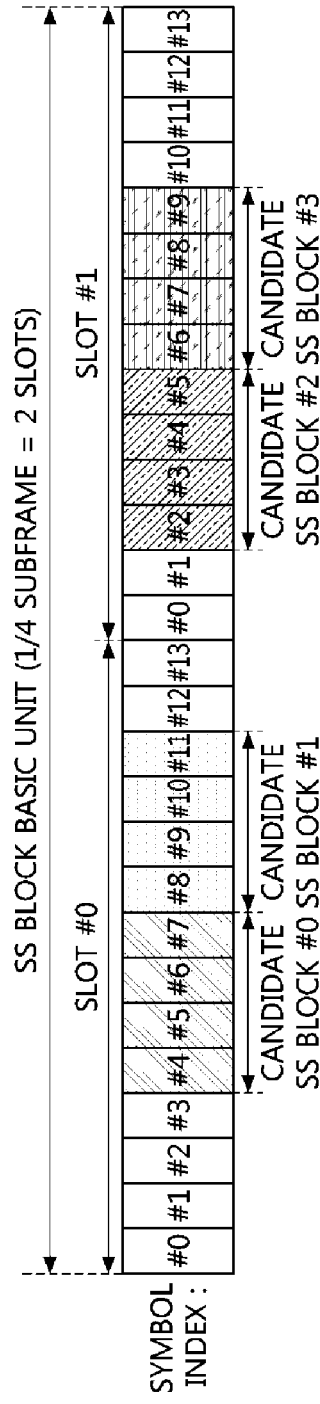
FIG. 16 is a conceptual diagram illustrating a third embodiment of SS block transmittable positions (e.g., candidate SS blocks) in a wireless communication network.

FIG. 16 is a conceptual diagram illustrating a third embodiment of SS block transmittable positions (e.g., candidate SS blocks) in a wireless communication network.

Referring to FIG. 16, when a 120 kHz subcarrier spacing is used, an SS block basic unit may be defined as a ¼ subframe or 2 slots. A ¼ subframe having a length of 0.25 ms may comprise 28 OFDM symbols and each of the 2 slots may comprise 14 OFDM symbols.

The OFDM symbols #0 to #3 of the slot #0 may be used for downlink transmission, the OFDM symbols #4 to #7 of the slot #0 may be used for transmission of one SS block, the OFDM symbols #8 to #11 of the slot #0 may be used for transmission of one SS block, and the OFDM symbols #12 to #13 of the slot #0 may be used for GP, downlink transmission, or uplink transmission. The OFDM symbols #0 to #1 of the slot #1 may be used for GP, downlink transmission, or uplink transmission, the OFDM symbols #2 to #5 of the slot #1 may be used for transmission of one SS block, the OFDM symbols #6 to #9 of the slot #1 may be used for transmission of one SS block, and the OFDM symbols #10 to #13 of the slot #1 may be used for GP, downlink transmission, or uplink transmission. The transmission of SS block may be restricted in the symbols allocated for GP, downlink transmission, or uplink transmission.

Similarly to the embodiments shown in FIGS. 14 and 15, symbols of the same size may be configured for GP, downlink transmission, or uplink transmission in a starting region, a middle region, and an ending region of the subframe, and the SS block may be transmitted in the remaining symbols.

In the wireless communication network in which a 120 kHz subcarrier spacing is used, the OFDM symbols #0 to #3 and #12 to #13 in slots satisfying 'slot number (mod) 2=0' may be used for GP, downlink, or uplink transmission, and the transmission of SS block may be restricted in the OFDM symbols #0 to #3 and #12 to #13. In the wireless communication network in which a 120 kHz subcarrier spacing is used, the OFDM symbols #0 to #1 and #10 to #13 in slots satisfying 'slot number (mod) 2=1' may be used for GP, downlink, or uplink transmission, and the transmission of SS block may be restricted in the OFDM symbols #0 to #1 and #10 to #13.

When one subframe includes M OFDM symbols and one slot includes K(=M/8) OFDM symbols, the positions in which the SS block is not transmitted may be represented as follows. The transmission of SS block may be restricted in the first symbol, the second OFDM symbol, the (K−2)-th OFDM symbol, and the (K−1)-th OFDM symbol in slots satisfying 'slot number (mod) 2=0' or 'slot number (mod) 2=1'. The transmission of SS block may be restricted in the OFDM symbols #2 to #3 in slots satisfying 'slot number (mod) 2=0'. The transmission of SS block may be restricted in the OFDM symbols #10 to #11 in slots satisfying 'slot number (mod) 2=1'. The SS block may be transmitted in the remaining OFDM symbols except the above-described OFDM symbols in which the transmission of SS block is restricted.

When one subframe includes M OFDM symbols and one slot includes K(=M/8) OFDM symbols, the starting OFDM symbol index of the candidate SS block in slots satisfying 'slot number (mod) 2=0' may be defined based on Equation 20. When one subframe includes M OFDM symbols and one slot includes K(=M/8) OFDM symbols, the starting OFDM symbol index of the candidate SS block in slots satisfying 'slot number (mod) 2=1' may be defined based on Equation 22.

Figure 17:
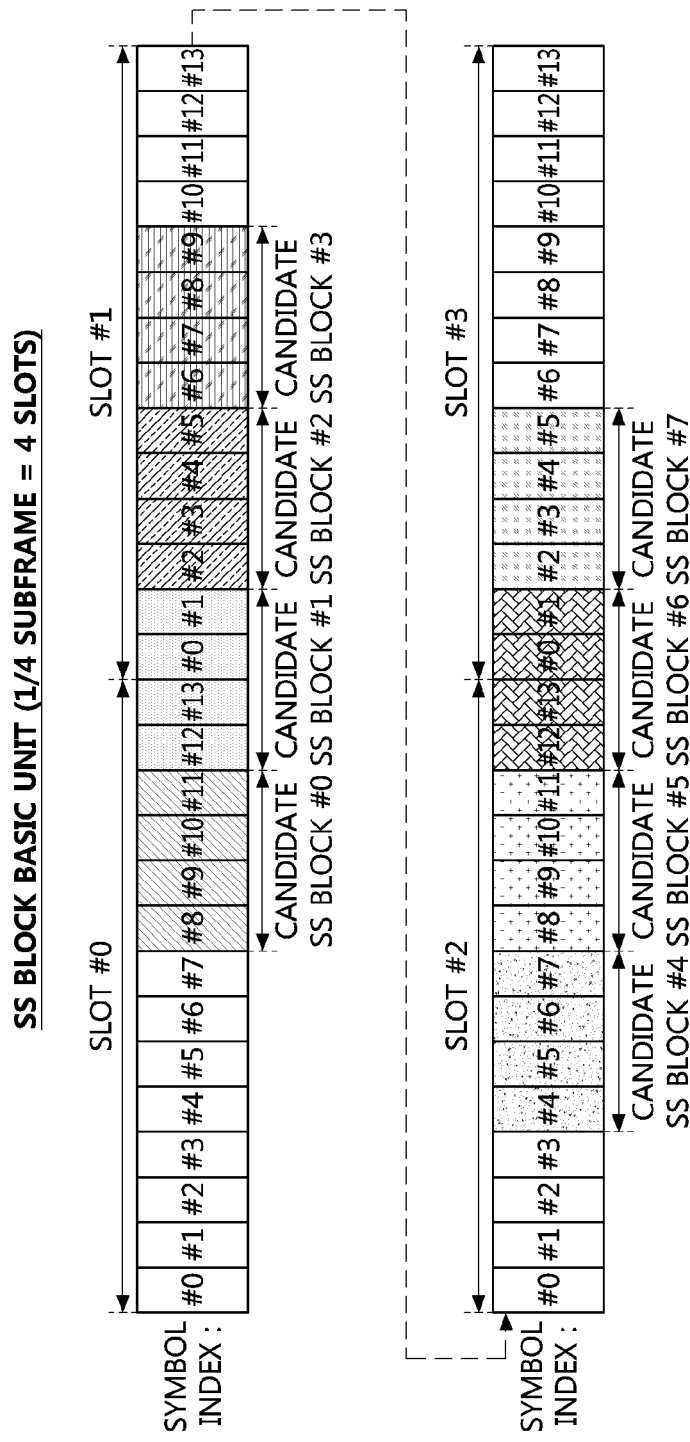
FIG. 17 is a conceptual diagram illustrating a fourth embodiment of SS block transmittable positions (e.g., candidate SS blocks) in a wireless communication network.

FIG. 17 is a conceptual diagram illustrating a fourth embodiment of SS block transmittable positions (e.g., candidate SS blocks) in a wireless communication network.

Referring to FIG. 17, when a 240 kHz subcarrier spacing is used, an SS block basic unit may be defined as a ¼ subframe or 4 slots. A ¼ subframe having a length of 0.25 ms may comprise 56 OFDM symbols and each of the 4 slots may comprise 14 OFDM symbols.

The OFDM symbols #0 to #7 of the slot #0 may be used for downlink transmission, the OFDM symbols #8 to #11 of the slot #0 may be used for transmission of one SS block, and the OFDM symbols #12 to #13 of the slot #0 and the OFDM symbols #0 to #1 of the slot #1 may be used for transmission of one SS block. The OFDM symbols #2 to #5 of the slot #1 may be used for transmission of one SS block, the OFDM symbols #6 to #9 of the slot #1 may be used for transmission of one SS block, and the OFDM symbols #10 to #13 of the slot #1 may be used for GP, downlink transmission, or uplink transmission.

The OFDM symbols #0 to #3 of the slot #2 may be used for GP, downlink transmission, or uplink transmission, the OFDM symbols #4 to #7 of the slot #2 may be used for transmission of one SS block, the OFDM symbols #8 to #11 of the slot #1 may be used for transmission of one SS block, and the OFDM symbols #12 to #13 of the slot #2 and the OFDM symbols #0 to #1 of the slot #3 may be used for transmission of one SS block. The OFDM symbols #2 to #5 of the slot #3 may be used for transmission of one SS block, the OFDM symbols #6 to #13 of the slot #3 may be used for GP, downlink transmission, or uplink transmission. The transmission of SS block may be restricted in the symbols used for GP, downlink transmission, or uplink transmission.

Similarly to the embodiments shown in FIGS. 14 to 16, symbols of the same size may be configured GP, downlink transmission, or uplink transmission may be configured in a starting region, a middle region, and an ending region of the subframe, and the SS block may be transmitted in the remaining symbols.

In the wireless communication network in which a 240 kHz subcarrier spacing is used, the OFDM symbols #0 to #7 in slots satisfying 'slot number (mod) 4=0' may be used for GP, downlink transmission, and the transmission of SS block may be restricted in the OFDM symbols #0 to #7. In the wireless communication network in which a 240 kHz subcarrier spacing is used, the OFDM symbols #10 to #13 in slots satisfying 'slot number (mod) 4=1' may be used for GP, downlink, or uplink transmission, and the transmission of SS block may be restricted in the OFDM symbols #10 to #13.

In the wireless communication network in which a 240 kHz subcarrier spacing is used, the OFDM symbols #0 to #3 in slots satisfying 'slot number (mod) 4=2' may be used for GP, downlink, or uplink transmission, and the transmission of SS block may be restricted in the OFDM symbols #0 to #3. In the wireless communication network in which a 240 kHz subcarrier spacing is used, the OFDM symbols #6 to #13 in slots satisfying 'slot number (mod) 4=3' may be used for GP, downlink, or uplink transmission, and the transmission of SS block may be restricted in the OFDM symbols #6 to #13.

When one subframe includes M OFDM symbols and one slot includes K(=M/16) OFDM symbols, the positions in which the SS block is not transmitted may be represented as follows. The transmission of SS block may be restricted in the OFDM symbols #0 to #3 in slots satisfying 'slot number (mod) 2=0'. The transmission of SS block may be restricted in the OFDM symbols #4 to #7 in slots satisfying 'slot number (mod) 4=0'. The transmission of SS block may be restricted in the OFDM symbols #10 to #13 in slots satisfying 'slot number (mod) 2=1'. The transmission of SS block may be restricted in the OFDM symbols #6 to #9 in slots satisfying 'slot number (mod) 4=3'. The SS block may be transmitted in the remaining OFDM symbols except the above-described OFDM symbols in which the transmission of SS block is restricted.

When one subframe includes M OFDM symbols and one slot includes K(=M/16) OFDM symbols, the starting OFDM symbol index of the candidate SS block in slots satisfying 'slot number (mod) 4=0' may be defined based on Equation 24.

$$j = i \times 4 + 8 \quad \text{[Equation 24]}$$

j may indicate the starting OFDM symbol index, and i may have a value from 0 to n. n may be defined based on Equation 25.

$$n = \lfloor K/4 \rfloor < 2 \quad \text{[Equation 25]}$$

K may indicate the number of OFDM symbols included in one slot, and $\lfloor K/4 \rfloor$ may be the greatest natural number (or, the greatest integer) smaller than a solution of (K/4).

When one subframe includes M OFDM symbols and one slot includes K(=M/16) OFDM symbols, the starting OFDM symbol index of the candidate SS block in slots satisfying 'slot number (mod) 4=1' may be defined based on Equation 26.

$$j = i \times 4 ° 2 \quad \text{[Equation 26]}$$

j may indicate the starting OFDM symbol index, and i may have a value from 0 to n. n may be defined based on Equation 27.

$$n = \lfloor K/4 \rfloor - 2 \quad \text{[Equation 27]}$$

K may indicate the number of OFDM symbols included in one slot, and $\lfloor K/4 \rfloor$ may be the greatest natural number (or, the greatest integer) smaller than a solution of (K/4).

When one subframe includes M OFDM symbols and one slot includes K(=M/16) OFDM symbols, the starting OFDM symbol index of the candidate SS block in slots satisfying 'slot number (mod) 4=2' may be defined based on Equation 28.

$$j = i \times 4 + 4 \quad \text{[Equation 28]}$$

j may indicate the starting OFDM symbol index, and i may have a value from 0 to n. n may be defined based on Equation 29.

$$n = \lfloor K/4 \rfloor - 1 \quad \text{[Equation 29]}$$

K may indicate the number of OFDM symbols included in one slot, and [K/4] may be the greatest natural number (or, the greatest integer) smaller than a solution of (K/4).

When one subframe includes M OFDM symbols and one slot includes K(=M/16) OFDM symbols, the starting OFDM symbol index of the candidate SS block in slots satisfying 'slot number (mod) 4=3' may be defined based on Equation 30.

$$j = i \times 3 + 2 \quad \text{[Equation 30]}$$

j may indicate the starting OFDM symbol index, and i may have a value from 0 to n. n may be defined based on Equation 31.

$$n = \lfloor K/4 \rfloor - 3 \quad \text{[Equation 31]}$$

K may indicate the number of OFDM symbols included in one slot, and $\lfloor K/4 \rfloor$ may be the greatest natural number (or, the greatest integer) smaller than a solution of (K/4).

Meanwhile, the SS block basic units described above may be mapped in a half frame. The length of one system frame may be 10 ms, and one system frame may comprise 10 subframes. The length of a half frame may be 5 ms, and one half frame may comprise 5 subframes. The configuration of the SS block basic units within the half frame may be defined as an 'SS block window', and the SS block basic units may be periodically configured according to a unit of the SS block window.

Figure 18A:
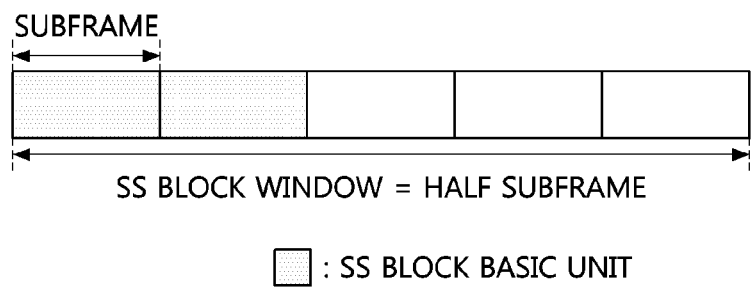
FIG. 18A is a conceptual diagram illustrating a first embodiment of an SS block window in a wireless communication network.

FIG. 18A is a conceptual diagram illustrating a first embodiment of an SS block window in a wireless communication network.

Referring to FIG. 18A, SS block basic units may be configured in the first and second subframes within a half frame, and SS blocks may be transmitted in the subframes in which the SS block basic units are configured. Here, the SS block basic unit may be the SS block basic unit (e.g., an SS block basic unit to which a 15 kHz subcarrier spacing is applied) in the embodiment shown in FIG. 14. Since the SS block basic units are not configured in the third, fourth, and fifth subframes within the half frame, so that the SS block may not be transmitted in the corresponding subframes.

Figure 18B:
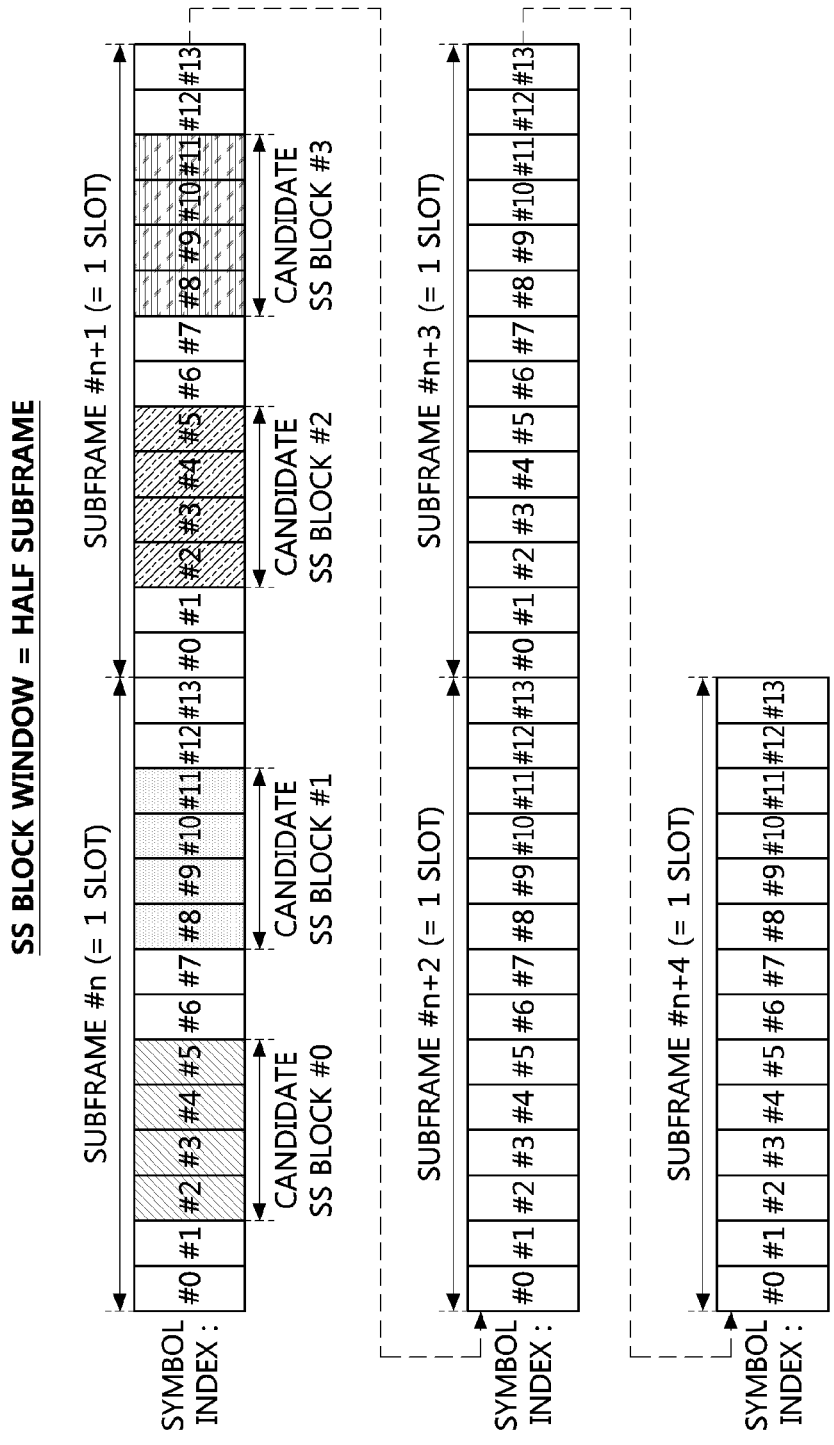
FIG. 18B is a conceptual diagram illustrating a first embodiment of SS block basic units included in the SS block window illustrated in FIG. 18A.

FIG. 18B is a conceptual diagram illustrating a first embodiment of SS block basic units included in the SS block window illustrated in FIG. 18A.

Referring to FIG. 18B, the number of SS block transmittable positions in one SS block basic unit may be 2, and each SS block transmittable position may be referred to as a candidate SS block #n. n may be an integer equal to or greater than 0. Since one SS block window includes 2 SS block basic units, the number of SS block transmittable positions in one SS block window may be 4, and the SS block transmittable positions may be referred to as candidate SS blocks #0 to #3.

Figure 18C:
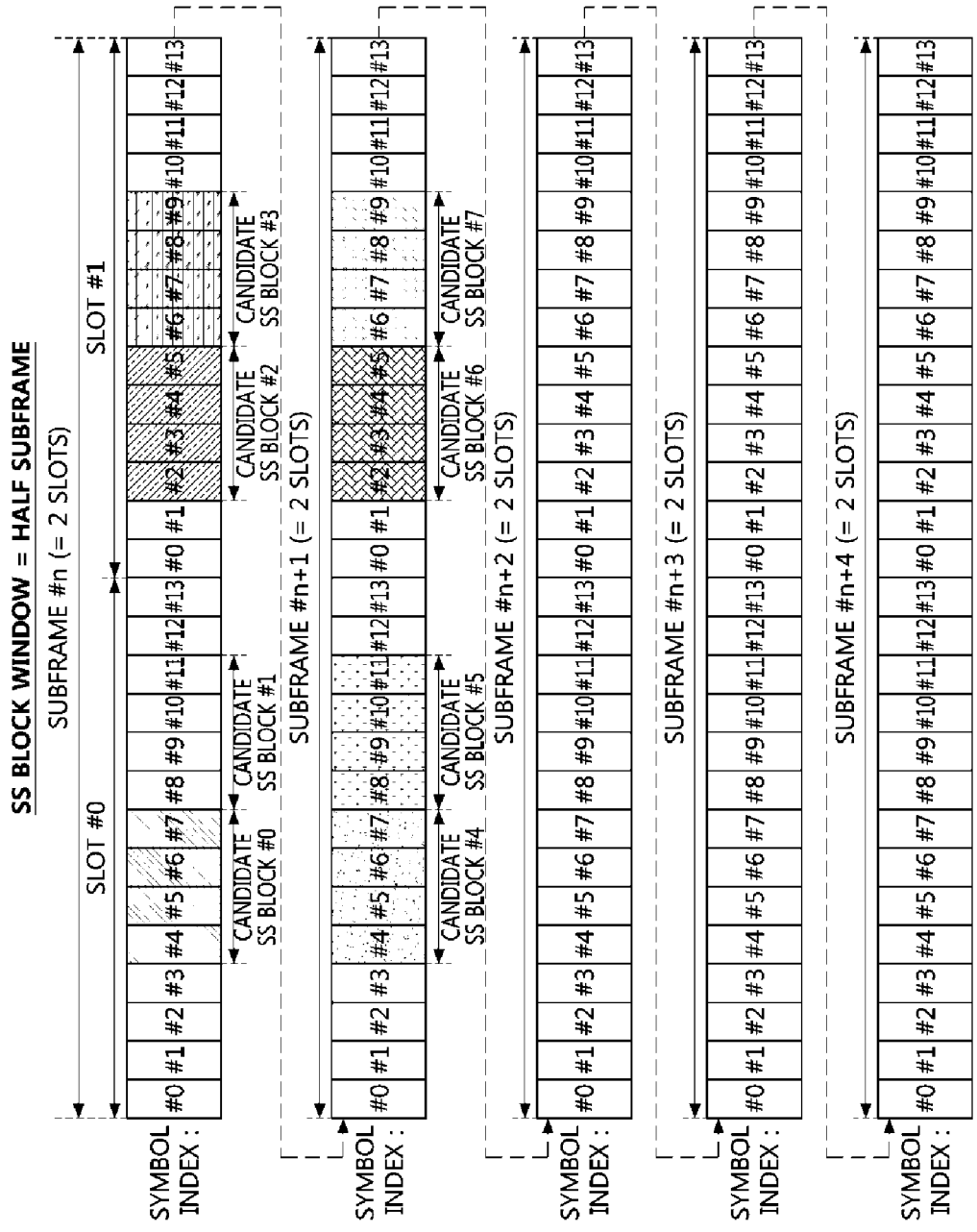
FIG. 18C is a conceptual diagram illustrating a second embodiment of SS block basic units included in the SS block window illustrated in FIG. 18A.

FIG. 18C is a conceptual diagram illustrating a second embodiment of SS block basic units included in the SS block window illustrated in FIG. 18A.

Referring to FIG. 18C, the number of SS block transmittable positions in one SS block basic unit may be 4, and each SS block transmittable position may be referred to as a candidate SS block #n. n may be an integer equal to or greater than 0. Since one SS block window includes 2 SS block basic units, the number of SS block transmittable positions in one SS block window may be 8, and the SS block transmittable positions may be referred to as candidate SS blocks #0 to #7.

Figure 19A:
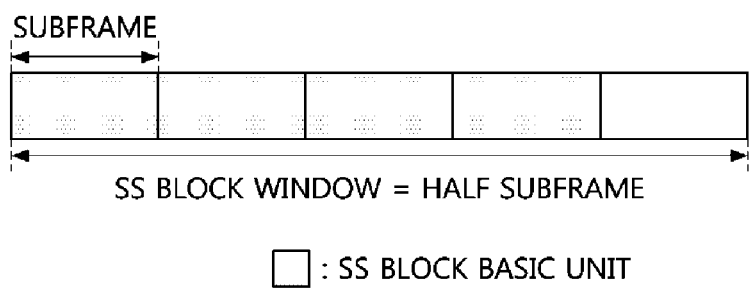
FIG. 19A is a conceptual diagram illustrating a second embodiment of an SS block window in a wireless communication network.

FIG. 19A is a conceptual diagram illustrating a second embodiment of an SS block window in a wireless communication network.

Referring to FIG. 19A, SS block basic units may be configured in first, second, third, and fourth subframes within a half frame, and SS blocks may be transmitted in the subframes in which the SS block basic units are configured. Here, the SS block basic unit may be the SS block basic unit (e.g., an SS block basic unit to which a 15 kHz subcarrier spacing is applied) in the embodiment shown in FIG. 14. Since the SS block basic units are not configured in the fifth subframe within the half frame, so that the SS block may not be transmitted in the corresponding subframe. In this case, the number of SS block transmittable positions in the half frame may be 8.

Comparing the embodiment shown in FIG. 18A with the embodiment shown in FIG. 19A, the number of SS block transmittable positions in the SS block window shown in FIG. 19A is twice the number of SS block transmittable positions in the SS block window shown in FIG. 18A. The base station may adjust the number of SS block transmittable positions by using the SS block window configuration shown in FIG. 18A or the SS block window configuration shown in FIG. 19A as needed. The SS block window configuration may vary depending on an operation frequency of the cell.

Figure 19B:
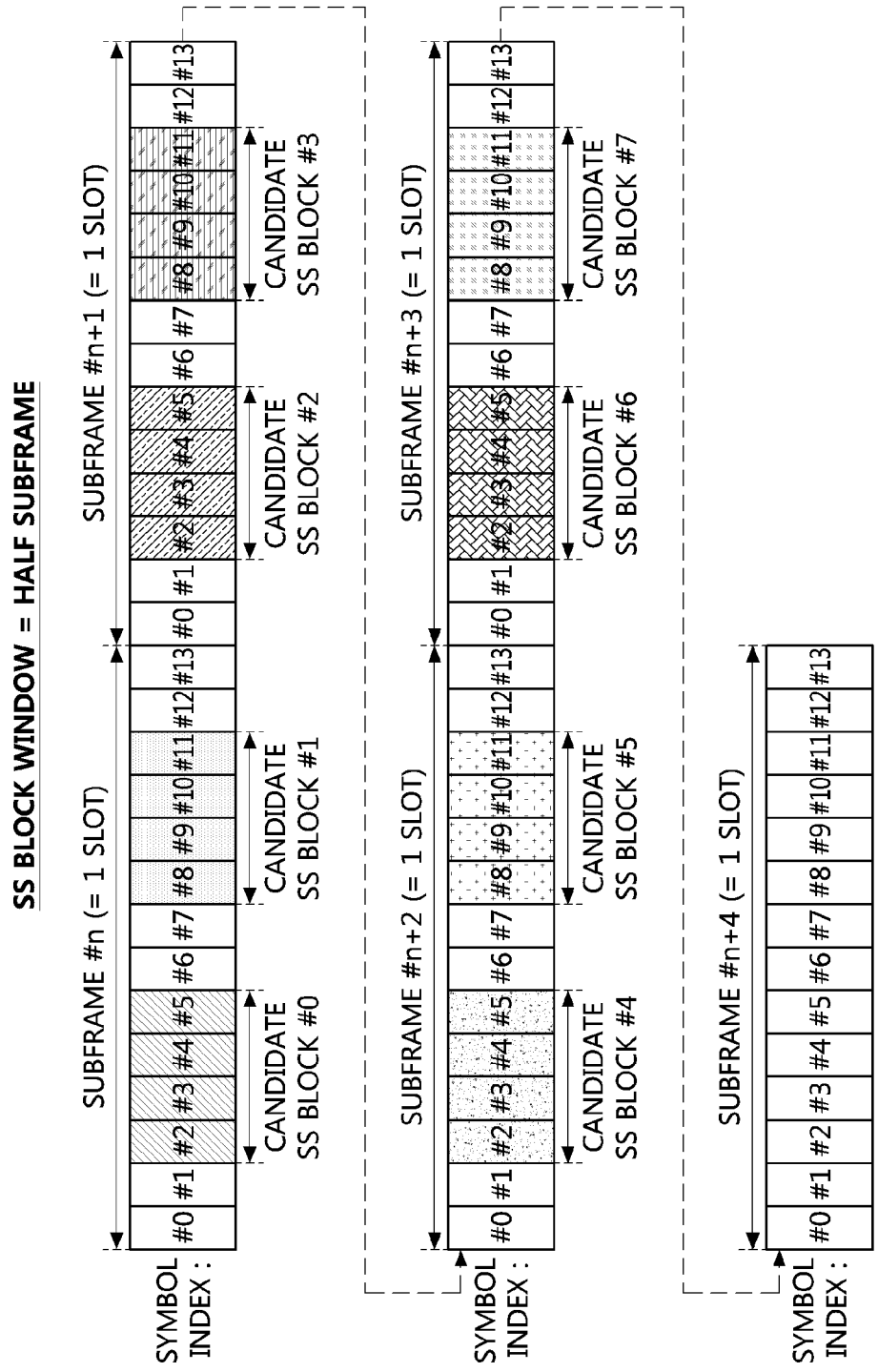
FIG. 19B is a conceptual diagram illustrating a first embodiment of SS block basic units included in the SS block window illustrated in FIG. 19A.

FIG. 19B is a conceptual diagram illustrating a first embodiment of SS block basic units included in the SS block window illustrated in FIG. 19A.

Referring to FIG. 19B, the number of SS block transmittable positions in one SS block basic unit may be 2, and each SS block transmittable position may be referred to as a candidate SS block #n. n may be an integer equal to or greater than 0. Since one SS block window includes 4 SS block basic units, the number of SS block transmittable positions in one SS block window may be 8, and the SS block transmittable positions may be referred to as candidate SS blocks #0 to #7.

Figure 20A:
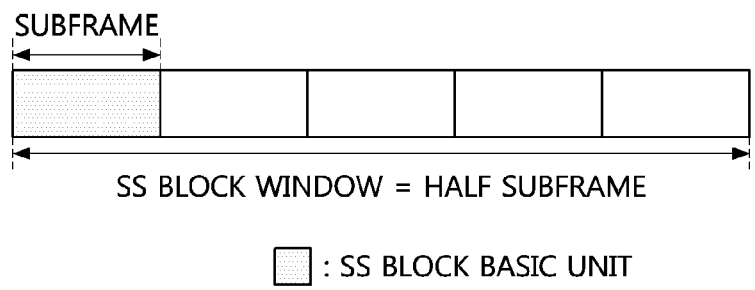
FIG. 20A is a conceptual diagram illustrating a third embodiment of an SS block window in a wireless communication network.

FIG. 20A is a conceptual diagram illustrating a third embodiment of an SS block window in a wireless communication network.

Referring to FIG. 20A, an SS block basic unit may be configured in the first subframe within a half frame, and SS blocks may be transmitted in the subframe in which the SS block basic unit is configured. Here, the SS block basic unit may be the SS block basic unit (e.g., an SS block basic unit to which a 30 kHz subcarrier spacing is applied) in the embodiment shown in FIG. 15. Since the SS block basic unit is not configured in the second, third, fourth, and fifth subframes within the half frame, so that the SS block may not be transmitted in the corresponding subframes.

Comparing the embodiment (e.g., the wireless communication network in which a 15 kHz subcarrier spacing is used) shown in FIG. 18A with the embodiment (e.g., the wireless communication network in which a 30 kHz subcarrier spacing is used) shown in FIG. 20A, a duration in which the SS block basic unit is configured in FIG. 20A may be half a duration in which the SS block basic unit is configured in FIG. 18A. However, since the number of SS block transmittable positions in the SS block basic unit when the 30 kHz subcarrier spacing is used is twice the number of SS block transmittable positions in the SS block basic unit when the 15 kHz subcarrier spacing is used, the number of SS block transmittable positions in the embodiment shown in FIG. 20A may be the same as the number of SS block transmittable positions in the embodiment shown in FIG. 18A.

Figure 20B:
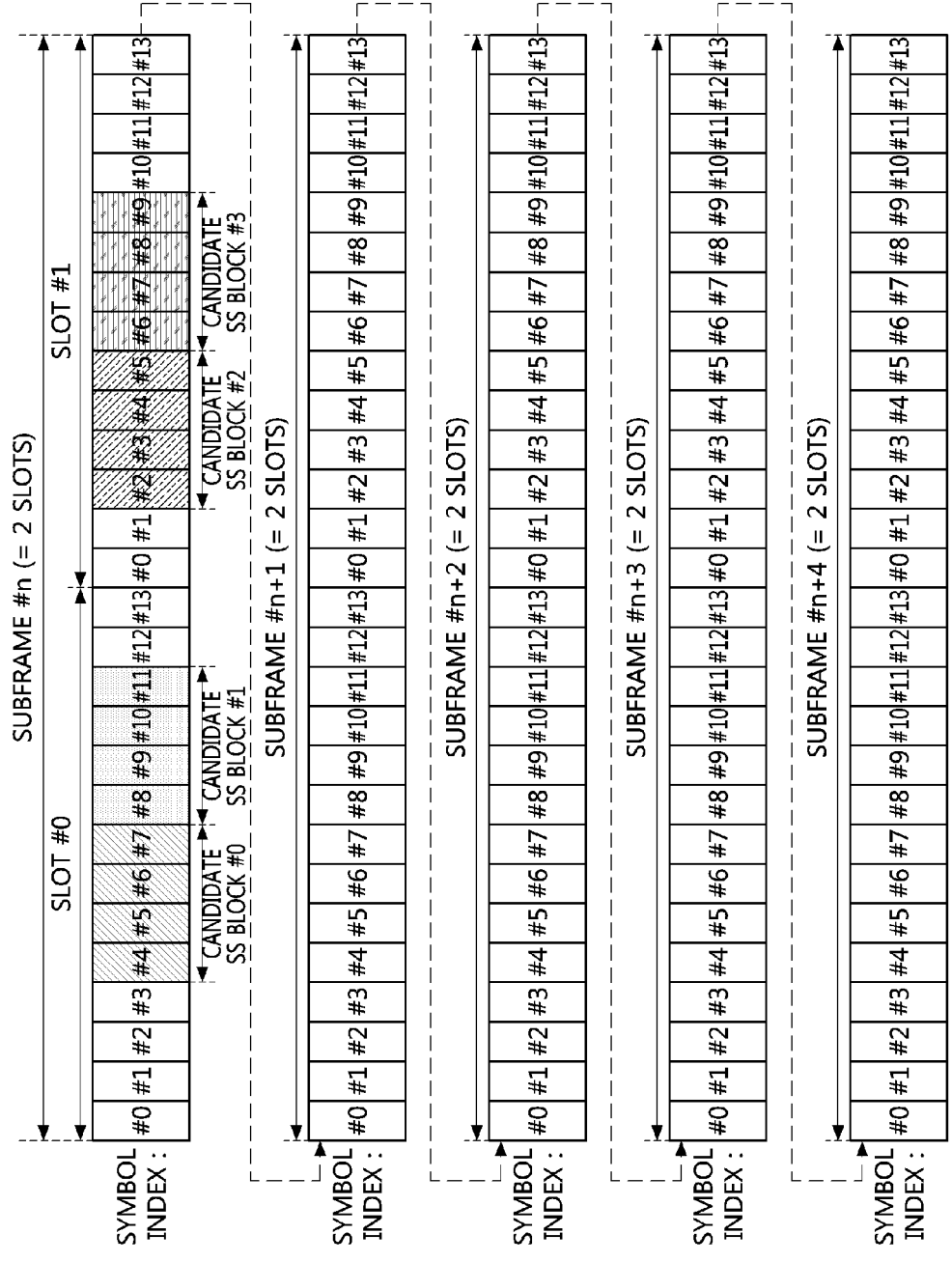
FIG. 20B is a conceptual diagram illustrating a first embodiment of SS block basic units included in the SS block window illustrated in FIG. 20A.

FIG. 20B is a conceptual diagram illustrating a first embodiment of SS block basic units included in the SS block window illustrated in FIG. 20A.

Referring to FIG. 20B, the number of SS block transmittable positions in one SS block basic unit may be 4, and each SS block transmittable position may be referred to as a candidate SS block #n. n may be an integer equal to or greater than 0. Since one SS block window (e.g., half frame) includes one SS block basic unit, the number of SS block transmittable positions of SS block in one SS block window may be 4, and the SS block transmittable positions may be referred to as candidate SS blocks #0 to #3.

In order to increase the SS block transmittable positions in the wireless communication network using a 30 kHz subcarrier spacing, SS block basic units may be configured within a half frame (e.g., SS block window), as in the embodiments shown in FIGS. 18A to 18C. Comparing the embodiments shown in FIGS. 18A to 18C with the embodiment shown in FIG. 20A, the number of SS block transmittable positions in the SS block window shown in FIG. 20A may be twice the number of SS block transmittable positions in the SS block window shown in FIGS. 18A to 18C. Here, the number of SS block transmittable positions may be the same as the number of SS block transmittable positions in the wireless communication network (e.g., the embodiment shown in FIG. 19A) using a 15 kHz subcarrier spacing. The number of SS block transmittable positions in the SS block window may be 8.

In the embodiments shown in FIGS. 18 to 20 described above, an index of the candidate SS block in the SS block window may be transmitted from the base station to the UE. For example, the base station may transmit a message (e.g., system information, radio resource control (RRC) signaling message, downlink control information (DCI), etc.) including information indicating the candidate SS block index to the UE. The UE may receive the message including information indicating the candidate SS block index from the base station, identify the candidate SS block index from the received message, and estimate an index of a currently-received SS block based on the identified candidate SS block index.

Also, the UE may obtain time information (e.g., synchronization information) of the cell based on the estimated SS block index. Here, the candidate SS block index may indicate the SS block transmittable position, and the SS block index may indicate a position in which the SS block is actually transmitted among the SS block transmittable positions. For example, when the number of SS block transmittable positions is 8, the candidate SS block index indicating each of the SS block transmittable positions may be set to one of #0 to #7, and the SS block index indicating the position in which the SS block is actually transmitted may be configured as a bitmap having a size of 8 bits. That is, one bit among the bits constituting the bitmap of the SS block index may indicate whether or not the SS block is actually transmitted at the corresponding SS block transmittable position. The SS block index may be referred to as an 'SS block index (SBI)'.

In the wireless communication network in which a 15 kHz subcarrier spacing is used (e.g., the embodiment shown in FIG. 18B) and the wireless communication network in which a 30 kHz subcarrier spacing is used (e.g., the embodiment shown in FIG. 20B), the base station may transmit to the UE a message indicating SBI #0 to #3. The SBI #0 to #3 may be indicated by the PBCH DMRS described with reference to Equations 1 to 7. The SBI may be indicated by the PBCH DMRS (e.g., the DMRS used for demodulating the PBCH in the SS block) in the SS block indicated by the SBI.

For example, the SBI may be used to determine the initial value of the subsequence used for generating the PBCH DMRS described with reference to Equations 6 and 7. The SBI may be used to determine at least one of the initial value $c_{init1}$ of $x_1(n)$ and the initial value $c_{init2}$ of $x_2(n)$. In this case, the UE receiving the SS block may estimate the SBI using the PBCH DMRS in the SS block, and obtain the time information (e.g., synchronization information) of the cell using the estimated SBI.

On the other hand, the initial value of the subsequence may be determined using the cell ID and the SBI. For example, the cell ID may be used to determine the initial value $c_{init1}$ of $x_1(n)$ and the SBI may be used to determine the initial value $c_{init2}$ of $x_2(n)$. Alternatively, the SBI may be used to determine the initial value $c_{init1}$ of $x_1(n)$ and the cell ID may be used to determine the initial value $c_{init2}$ of $x_2(n)$.

In another embodiment, a value generated by a combination of the cell ID and the SBI may be used to determine at least one of the initial value $c_{init1}$ of $x_1(n)$ and the initial value $c_{init2}$ of $x_2(n)$. When the initial value $c_{init1}$ of $x_1(n)$ is determined using the value generated by the combination of the cell ID and the SBI, the initial value $c_{init2}$ of $x_2(n)$ may be set to a predefined value. When the initial value $c_{init2}$ of $x_2(n)$ is determined using the value generated by the combination of the cell ID and the SBI, the initial value $c_{init1}$ of $x_1(n)$ may be set to a predefined value.

On the other hand, the SBI may be composed of 3 bits. In the embodiments shown in FIGS. 18 to 20, since the number of SS block transmittable positions (e.g., candidate SS blocks #0 to #3) is 4, valid bits among the 3 bits constituting the SBI may be 2 bits, and the remaining 1 bit may be a reserved bit. The valid bits may be LSB 2 bits among the 3 bits constituting the SBI, and the remaining 1 bit may be set to '0'. In this case, the base station may use the 2 valid bits indicating the SBI to determine the initial value of the subsequence of the PBCH DMRS, generate the PBCH DMRS using the determined initial value, and transmit the generated PBCH DMRS (e.g., an SS block including the PBCH DMRS). The UE receiving the SS block may estimate the SBI of the corresponding SS block using the PBCH DMRS in the SS block.

As another embodiment, in the embodiments shown in FIGS. 18 to 20 in which the SBI is composed of 3 bits, 2 bits among the 3 bits constituting the SBI may indicate the SBI, and the remaining 1 bit may indicate the index of the half frame (e.g., the index of the half frame through which the SS block is transmitted). If the remaining one of the 3 bits constituting the SBI is set to '0', this may indicate that the corresponding SS block is transmitted in the half frame #0. If the remaining one of the 3 bits constituting the SBI is set to '1', this may indicate that the corresponding SS block is transmitted in the half frame #1.

In this case, the base station may determine the initial values of the subsequences of the PBCH DMRS using 2 bits indicating the SBI and 1 bit indicating the half frame in which the SS block is transmitted, generate the PBCH DMRS using the determined initial values, and transmit the generated PBCH DMRS (e.g., an SS block including the PBCH DMRS). The UE receiving the SS block may estimate the SBI of the corresponding SS block and the index of the half frame in which the corresponding SS block is transmitted by using the PBCH DMRS in the SS block.

In the embodiments shown in FIGS. 18C and 19B, the number of SS block transmittable positions (e.g., candidate SS blocks #0 to #7) in the SS block window may be 8. When the SBI is composed of 3 bits, the 3 bits may be used to indicate the SBIs #0 to #7. Identically or similarly to the above-described embodiments, the base station may determine the initial values of the subsequences of the PBCH DMRS using 3 bits indicating the SBI, generate the PBCH DMRS using the determined initial values, and transmit the generated PBCH DMRS (e.g., an SS block including the PBCH DMRS).

The UE receiving the SS block may estimate the SBI of the corresponding SS block using the PBCH DMRS in the SS block. When the SBI is configured with 3 bits and all 3 bits are used to indicate the SBI, the index of the half frame in which the SS block is transmitted may be indicated by the PBCH in the corresponding SS block. That is, the information indicating the index of the half frame in which the SS block is transmitted may be transmitted in the PBCH in the corresponding SS block.

In the embodiments shown in FIGS. 18 to 20, the SS block window may be periodically configured, and the SS block may be transmitted in the periodically-configured SS block window.

Figure 21:
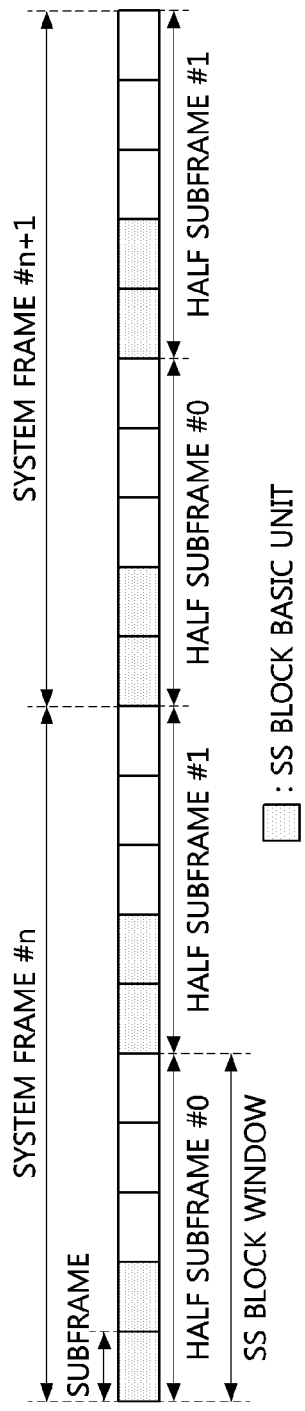
FIG. 21 is a conceptual diagram illustrating a first embodiment of SS block windows periodically configured in a wireless communication network.

FIG. 21 is a conceptual diagram illustrating a first embodiment of SS block windows periodically configured in a wireless communication network.

Referring to FIG. 21, the SS block window shown in FIG. 18A may be configured according to a periodicity of 5 ms. The configuration of the SS block window shown in FIGS. 18A to 18C may be applied to a half frame #0 of a system frame #n. When the periodicity of the SS block window is 5 ms, the configuration of the SS block window may be applied to a half frame #1 after the half frame #0 in the same manner as the half frame #0. Also, the configuration of the SS block window shown in FIGS. 18A to 18C may be applied to half frames #0 to #1 in a system frame #(n+1) after the system frame #n.

Figure 22:
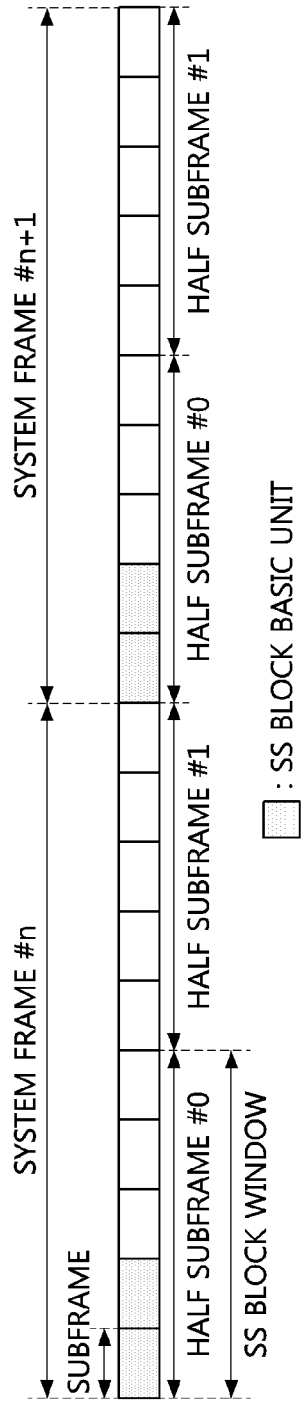
FIG. 22 is a conceptual diagram illustrating a second embodiment of SS block windows periodically configured in a wireless communication network.

FIG. 22 is a conceptual diagram illustrating a second embodiment of SS block windows periodically configured in a wireless communication network.

Referring to FIG. 22, the SS block window shown in FIG. 18A may be configured according to a periodicity of 10 ms. The configuration of the SS block window shown in FIGS. 18A to 18C may be applied to a half frame #0 of a system frame #n. When the periodicity of the SS block window is 10 ms, the configuration of the SS block window may be applied to a half frame #0 in a system frame #(n+1) after the system frame #n in the same manner as the above-described half frame #0. The configuration of the SS block window may not be applied to the half frame #1 in the system frame (e.g., the system frame #n, #(n+1), or the like).

Figure 23:
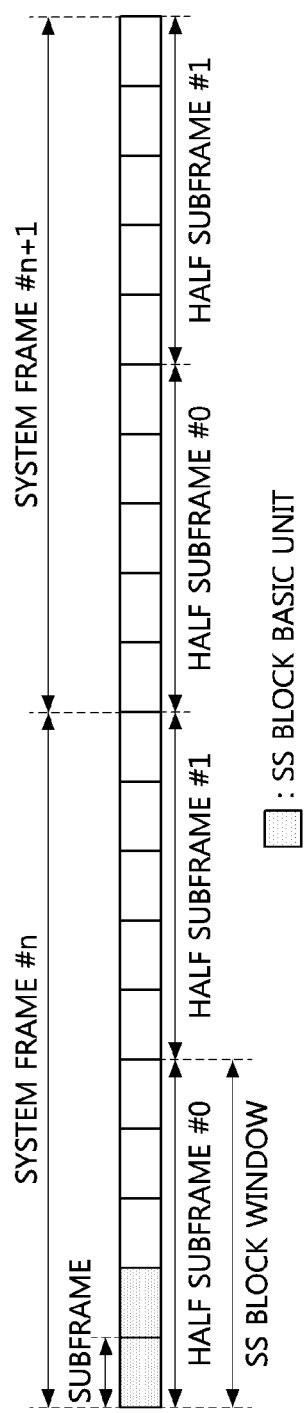
FIG. 23 is a conceptual diagram illustrating a third embodiment of SS block windows periodically configured in a wireless communication network.

FIG. 23 is a conceptual diagram illustrating a third embodiment of SS block windows periodically configured in a wireless communication network.

Referring to FIG. 23, the SS block window shown in FIG. 18A may be configured according to a periodicity of 20 ms. The configuration of the SS block window shown in FIGS. 18A to 18C may be applied to a half frame #0 of a system frame #n. When the periodicity of the SS block window is 20 ms, the configuration of the SS block window may not be applied to a system frame #(n+1) after the system frame #n, and the configuration of the SS block window may be applied to a half frame #0 of a system frame #(n+2) (not shown) after the system frame #(n+1).

Figure 24:
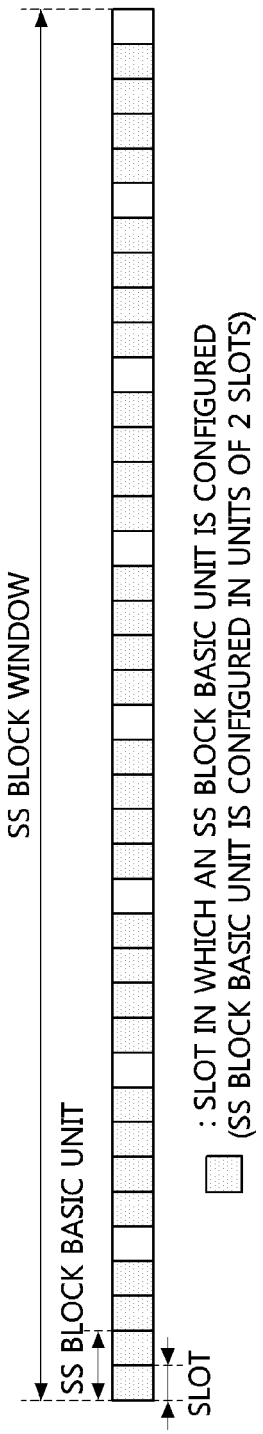
FIG. 24 is a conceptual diagram illustrating a fourth embodiment of SS block windows in a wireless communication network.

Meanwhile, in the embodiments shown in FIGS. 18 to 20, the configuration of the SS block window may be applied to subframes #0 to #4 or subframes #5 to #9. FIG. 24 is a conceptual diagram illustrating a fourth embodiment of SS block windows in a wireless communication network.

Referring to FIG. 24, in the wireless communication network in which a 120 kHz subcarrier spacing is used, the SS block basic unit in the SS block window may be the same as the SS block basic unit shown in FIG. 16. The SS block basic unit may be configured in a ¼ subframe (e.g., 2 slots). In this case, a half frame may comprise 40 slots, and a number (e.g., index) indicating each of 40 slots in 5 subframes belonging to the half frame may be set to #0, #1, . . . , or #39. In this case, the SS block may be transmitted in a slot #n satisfying Equation 32 below. n may be a slot number (e.g., slot index).

$$n(\text{mod})5=0,1,2,3 \quad \text{[Equation 32]}$$

The SS block may not be transmitted in a slot #n satisfying Equation 33.

$$n(\text{mod})5=4 \quad \text{[Equation 33]}$$

In the embodiment shown in FIG. 16 (e.g., the wireless communication network in which a 120 kHz subcarrier spacing is used), the SS block basic unit may be configured as 2 slots. Accordingly, the configuration of the SS block basic unit shown in FIG. 24 may be applied to a slot #n satisfying Equation 34 and a slot #n+1 consecutive with the slot #n.

$$n(\text{mod})5=0,2 \quad \text{[Equation 34]}$$

The number of SS block transmittable positions (e.g., candidate SS blocks) in the half frame of the wireless communication network in which a 120 kHz subcarrier spacing is used may be 64.

Figure 25:
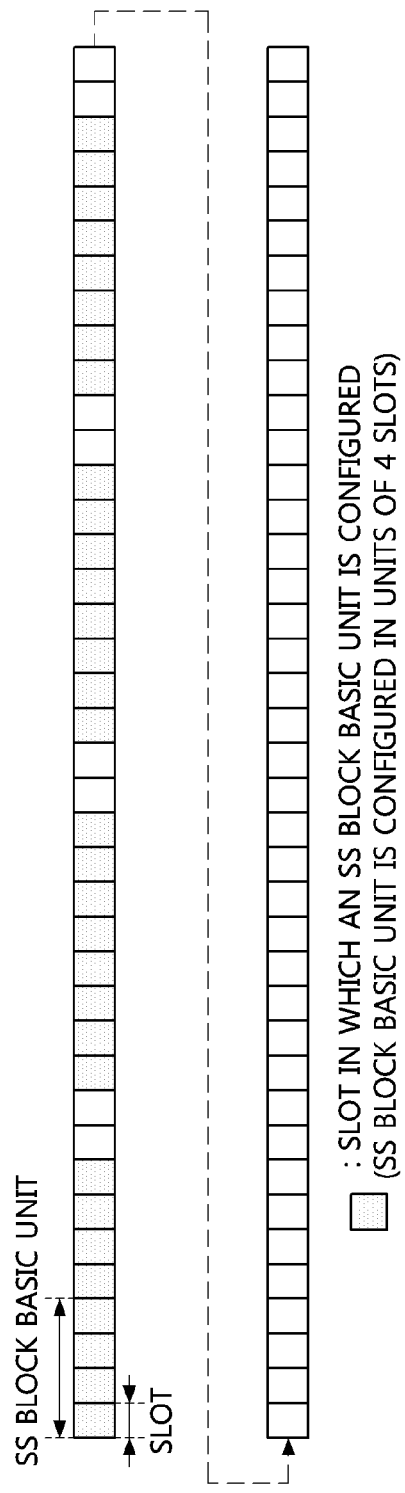
FIG. 25 is a conceptual diagram illustrating a fifth embodiment of SS block windows in a wireless communication network.

FIG. 25 is a conceptual diagram illustrating a fifth embodiment of SS block windows in a wireless communication network.

Referring to FIG. 25, in the wireless communication network in which a 240 kHz subcarrier spacing is used, the SS block basic unit in the SS block window may be the same as the SS block basic unit shown in FIG. 17. The SS block basic unit may be configured in a ¼ subframe (e.g., 4 slots). In this case, a half frame may comprise 80 slots, and a number (e.g., index) indicating each of 80 slots in 5 subframes belonging to the half frame may be set to #0, #1, . . . , or #79. In this case, the SS block may be transmitted in a slot #n satisfying Equations 35 and 36 below. n may be a slot number (e.g., slot index).

$$n(\text{mod})10=0\ 2,3,4,5,6,7 \quad \text{[Equation 35]}$$

$$\lfloor n/40 \rfloor=0,2 \quad \text{[Equation 36]}$$

The SS block may not be transmitted in a slot #n satisfying Equation 37.

$$n(\text{mod})10=8,9 \quad \text{[Equation 37]}$$

In the embodiment shown in FIG. 17 (e.g., the wireless communication network in which a 240 kHz subcarrier spacing is used), the SS block basic unit may be configured as 4 slots. Accordingly, the configuration of the SS block basic unit shown in FIG. 25 may be applied to a slot #n satisfying Equations 36 and 38 and slots #n+1 to #n+3 consecutive with the slot #n.

$$n(\text{mod})10=0,4 \quad \text{[Equation 38]}$$

The number of SS block transmittable positions (e.g., candidate SS blocks) in the half frame of the wireless communication network in which a 240 kHz subcarrier spacing is used may be 64.

Meanwhile, in the embodiments shown in FIGS. 18 to 25, the configuration of the SS block window may be applied to subframes #0 to #4 or subframes #5 to #9.

When a 120 kHz subcarrier spacing is used in the embodiment shown in FIG. 23, an SS block burst may be configured and defined within one SS block window. In the embodiment shown in FIG. 23, the number of SS block transmittable positions (e.g., candidate SS blocks) in one SS block window may be 64. The SS block burst may be configured in units of 8 candidate SS blocks among 64 candidate SS blocks. The SS block burst may be a set of candidate SS blocks present in consecutive slots. Here, the candidate SS block may be the same as the candidate SS block in the embodiments shown in FIGS. 16 and 21. In this case, there may be 8 candidate SS blocks in one SS block burst.

In another embodiment, one SS block burst may be configured identically to one SS block basic unit. In this case, in the embodiments shown in FIGS. 16 and 21, there may be 16 SS block bursts in the SS block window, and each of the 16 SS block bursts may include 4 candidate SS blocks.

In another embodiment, the SS block burst may be a set of candidate SS blocks present in consecutive OFDM symbols. In this case, there may be 32 SS block bursts in the SS block window in the embodiments shown in FIGS. 16 and 21, and each of the 32 SS block bursts may include 2 candidate SS blocks.

In the embodiment shown in FIG. 23, 8 SS block bursts may be configured in the SS block window, and the 8 SS block bursts may be referred to as SS block bursts #0 to #7. There may be 8 candidate SS blocks in each of the 8 SS block bursts, and the 8 candidate SS blocks may be referred to as SBIs #0 to #7 (e.g., candidate SS blocks #0 to #7). The base station may transmit the index of the SS block burst in which the SS block is transmitted and the SBI to the UE. For example, the base station may transmit an SS block including the SS block burst index and the SBI.

The 'SS block burst index and SBI' may be represented by one index indicator. Among bits constituting the index indicator, the MSBs may indicate the SS block burst index, and the LSBs may indicate the SBI. For example, when the SS block burst index is set to '111' and the SBI is set to '000', the index indicator may be set to '111000'. In this case, among the 6 bits constituting the index indicator, the MSB 3 bits may indicate the SS block burst index, and among the 6 bits constituting the index indicator, the LSB 3 bits may indicate the SBI.

For example, the base station may transmit to the UE a PBCH DMRS (e.g., SS block including the PBCH DMRS) indicating the SS block burst index. In this case, the initial value of the subsequence used for generating the PBCH DMRS described with reference to Equations 6 and 7 may be determined based on the SS block burst index. The SS block burst index may be used to determine at least one of the initial value $c_{init1}$ of $x_1(n)$ and the initial value $c_{init2}$ of $x_2(n)$. The UE may receive the SS block from the base station, obtain the PBCH DMRS of the received SS block, and estimate the SS block burst index based on the obtained PBCH DMRS (e.g., the initial value used for generating the PBCH DMRS).

In another embodiment, the base station may transmit an SS block including a PBCH including information indicating the SS block burst index to the UE. The UE may receive the SS block from the base station, and estimate the SS block burst index by demodulating the PBCH included in the SS block. When the 'SS block burst index and SBI' is represented as one index indicator, MSBs indicating the SS block burst index among bits constituting the index indicator may be transmitted through the PBCH. In this case, the UE may receive the SS block from the base station, and estimate the SS block burst index by demodulating the PBCH included in the SS block.

In another embodiment, the base station may scramble a PBCH by using the SS block burst index, and transmit an SS block including the scrambled PBCH to the UE. The UE may receive the SS block from the base station, and estimate the SS block burst index based on a scrambling sequence for the PBCH included in the SS block. In this case, the SS block burst index may be used to determine an initial value of the scrambling sequence for the PBCH. For example, when the scrambling of the PBCH is performed based on Equation 16, the scrambling sequence may be generated based on Equations 1 to 7. That is, the SS block burst index may be used to determine at least one of the initial values $c_{init1}$ and $c_{init2}$ of the subsequences described with reference to Equations 6 and 7.

Meanwhile, in the embodiment shown in FIG. 23, there may be 8t candidate SS blocks in one SS block burst, and the 8 candidate SS blocks may be referred to as SBIs #0 to #7. For example, the base station may generate a PBCH including information indicating the SBI, and may transmit the SS block including the PBCH to the UE.

For example, the base station may transmit a PBCH DMRS indicating the SBI to the UE. In this case, the initial value of the subsequence used for generating the PBCH DMRS described with reference to Equations 6 and 7 may be determined based on the SBI. The SBI may be used to determine at least one of the initial value $c_{init1}$ of $x_1(n)$ and the initial value $c_{init2}$ of $x_2(n)$. The UE may receive the SS block from the base station, obtain the PBCH DMRS of the received SS block, and estimate the SBI based on the obtained PBCH DMRS (e.g., the initial value used for generating the PBCH DMRS).

When the 'SS block burst index and SBI' is represented as one index indicator, LSBs indicating the SBI among bits constituting the index indicator may be transmitted through the PBCH DMRS.

In another embodiment, the initial value of the subsequence may be determined based on the cell ID and SBI. The initial value $c_{init1}$ of $x_1(n)$ may be determined based on the cell ID, and the initial value $c_{init2}$ of $x_2(n)$ may be determined based on the SBI. Alternatively, the initial value $c_{init1}$ of $x_1(n)$ may be determined based on the SBI, and the initial value $c_{init2}$ of $x_2(n)$ may be determined based on the cell ID. In another embodiment, a value generated as a combination of the cell ID and the SBI may be used to determine at least one of the initial value $c_{init1}$ of $x_1(n)$ and the initial value $c_{init2}$ of $x_2(n)$.

When the initial value $c_{init1}$ of $x_1(n)$ is determined based on the value generated as the combination of the cell ID and the SBI, the initial value $c_{init2}$ of $x_2(n)$ may be set to a predefined value. When the initial value $c_{init2}$ of $x_2(n)$ is determined based on the value generated as the combination of the cell ID and the SBI, the initial value $c_{init1}$ of $x_1(n)$ may be set to a predefined value.

In another embodiment, the base station may scramble a PBCH by using the SBI, and transmit an SS block including the scrambled PBCH to the UE. The UE may receive the SS block from the base station, and estimate the SBI based on a scrambling sequence for the PBCH included in the SS block. In this case, the SBI may be used to determine an initial value of the scrambling sequence for the PBCH. For example, when the scrambling of the PBCH is performed based on Equation 16, the scrambling sequence may be generated based on Equations 1 to 7. That is, the SBI may be used to determine at least one of the initial values $c_{init1}$ and $c_{init2}$ of the subsequences described with reference to Equations 6 and 7.

Figure 26A:
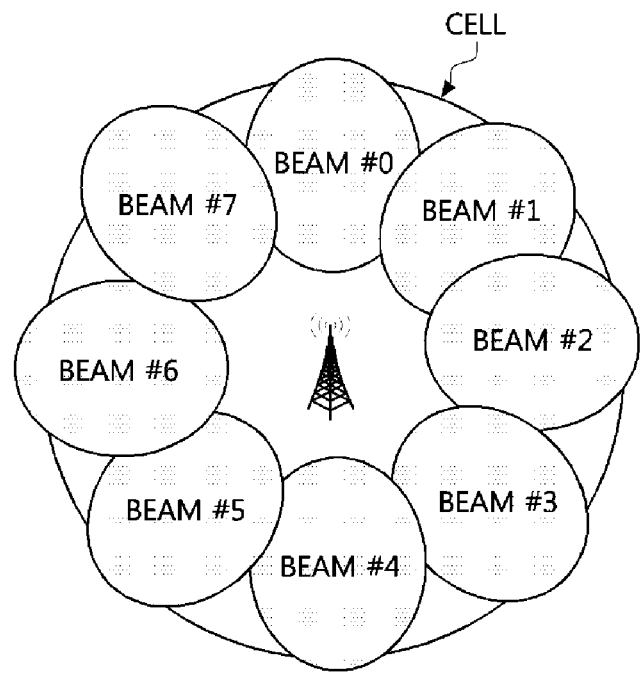
FIG. 26A is a conceptual diagram illustrating a first embodiment of a multi-beam-based signal transmission method in a wireless communication network.
Figure 26B:
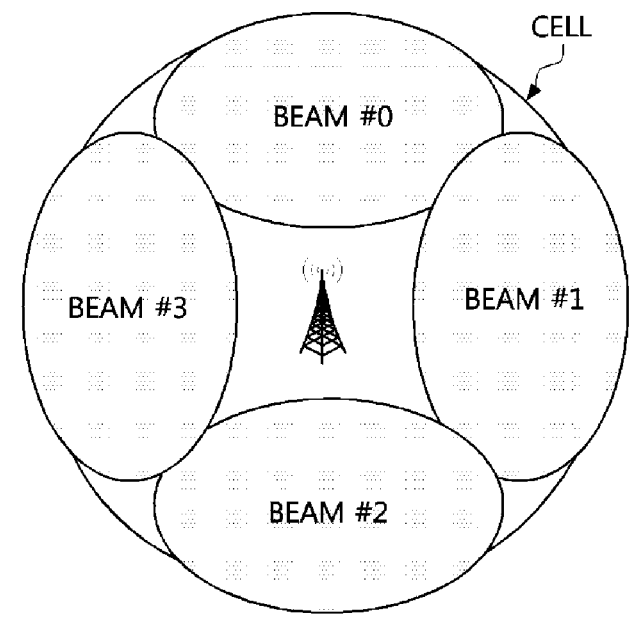
FIG. 26B is a conceptual diagram illustrating a second embodiment of a multi-beam-based signal transmission method in a wireless communication network.
Figure 26C:
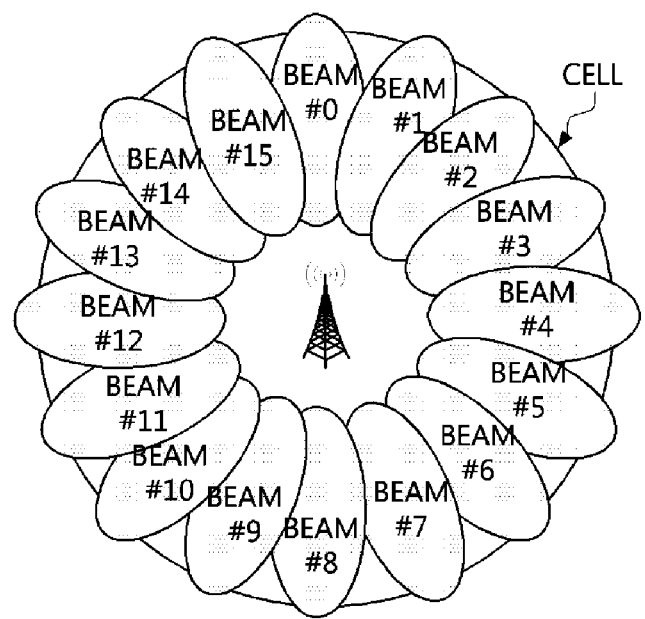
FIG. 26C is a conceptual diagram illustrating a third embodiment of a multi-beam-based signal transmission method in a wireless communication network.

FIG. 26A is a conceptual diagram illustrating a first embodiment of a multi-beam-based signal transmission method in a wireless communication network, FIG. 26B is a conceptual diagram illustrating a second embodiment of a multi-beam-based signal transmission method in a wireless communication network, and FIG. 26C is a conceptual diagram illustrating a third embodiment of a multi-beam-based signal transmission method in a wireless communication network.

Referring to FIGS. 26A to 26C, the base station may transmit an SS block using a beam. The SS block may be used for acquisition of synchronization information and common information in UEs located in the cell of the base station. The beam may refer to a signal directed to a specific area. For example, the base station may transmit an SS block using a beam #1 to UEs belonging to an area #1 to which the beam #1 is directed, and the UEs belonging to the area #1 may receive the SS block transmitted through the beam #1. On the other hand, UEs not belonging to the area #1 may not receive the SS block transmitted through the beam #1.

In the embodiment of FIG. 26A, the base station may transmit SS blocks using 8 beams, in which case the cell of the base station may be evenly divided into 8 areas. In the embodiment of FIG. 26B, the base station may transmit SS blocks using 4 beams, in which case the cell of the base station may be evenly divided into 4 areas. In the embodiment of FIG. 26C, the base station may transmit SS blocks using 16 beams, in which case the cell of the base station may be evenly divided into 16 areas.

The base station may transmit the SS blocks based on a beam sweeping scheme. For example, the base station may transmit an SS block using a beam #n in an SS block transmittable position within a time interval #n. Here, n may be an integer equal to or greater than 0. In this case, the SS blocks may be transmitted through different beams based on a TDM scheme, and a unit of the TDM may be a unit of the SS block transmittable position.

In the embodiment shown in FIG. 26A, a UE belonging to the cell of the base station may be assumed to receive at least one of the beams #0 to #7. When there are n beams and the base station sequentially transmits n beams in the respective specific time intervals, a UE belonging to the cell of the base station may be assumed to receive signals transmitted through one or more beams among n beams. Therefore, when n beams are transmitted from the base station, it may be assumed that signal transmission for the entire cell is completed, and all UEs located in the cell receive signals transmitted through one or more beams among the n beams.

Further, the beams of the base station may be formed to evenly divide the cell. For example, in the embodiment shown in FIG. 26A, a direction of the beam #0 may be opposite to a direction of the beam #4, and a direction of the beam #1 may be intermediate between the direction of the beam #0 and the direction of the beam #2. When the base station transmits the SS blocks using n beams and an index k of each of the n beams is defined as 'k=0, 1, . . . , n−1', the k-th beam $B_k$ may be defined based on Equation 39. $\theta(k/n)$ may be a function indicating a beam coefficient dependent upon (k/n).

$$B_k = \theta(k/n) \quad \text{[Equation 39]}$$

Figure 27:
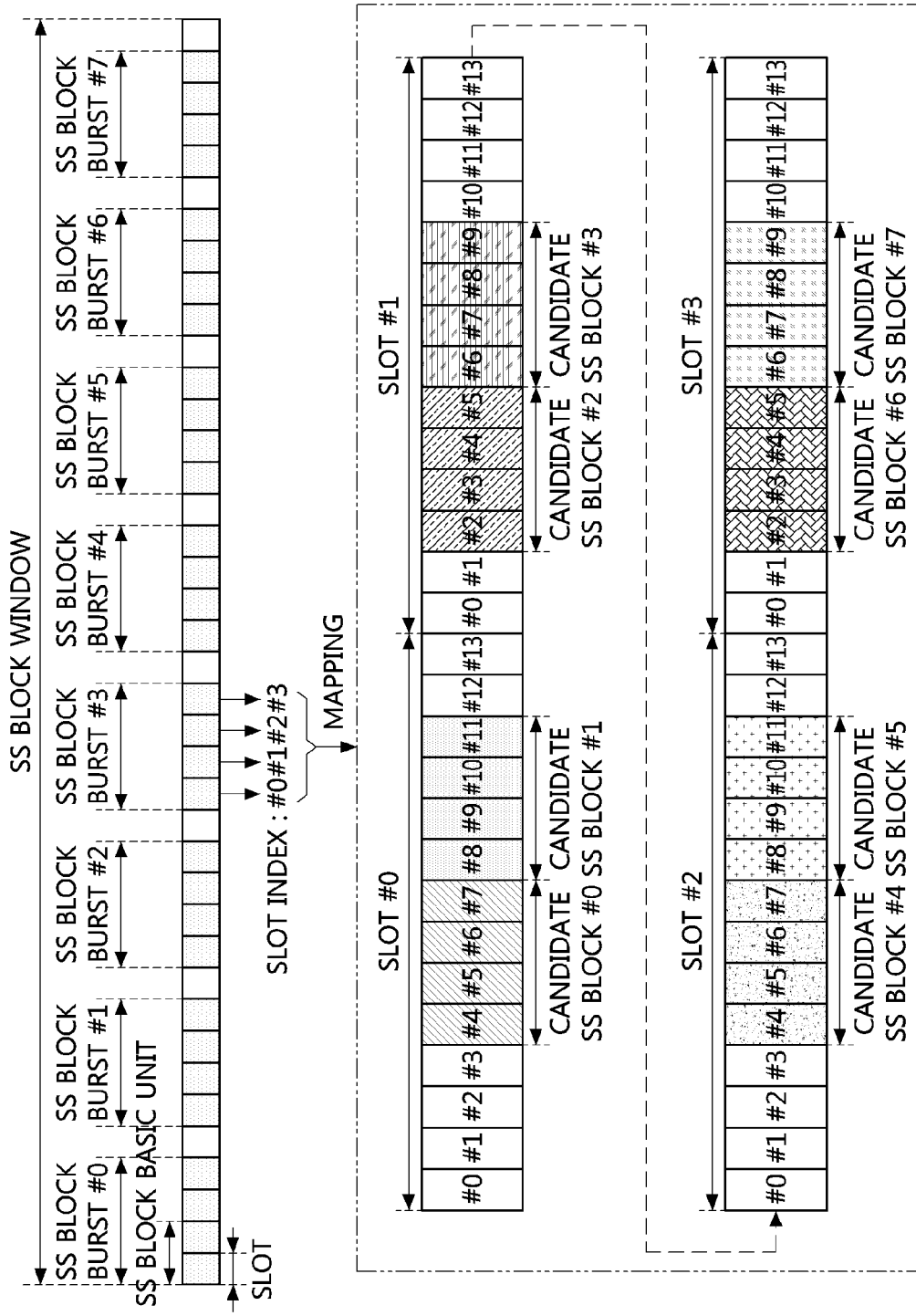
FIG. 27 is a conceptual diagram illustrating a first embodiment of SS block bursts in a wireless communication network.

FIG. 27 is a conceptual diagram illustrating a first embodiment of SS block bursts in a wireless communication network.

Referring to FIG. 27, SS block bursts may be configured in the wireless communication network using a 120 kHz subcarrier spacing. The SS block bursts may be configured and defined within one SS block window. The number of candidate SS blocks in one SS block window may be 64. The 64 candidate SS blocks may be divided in units of 8 candidate SS blocks so as to form 8 SS block bursts. The SS block burst may be a set of candidate SS blocks present in consecutive slots. The candidate SS block may be the same as the candidate SS block in the embodiment shown in FIG. 16 and FIG. 24. There may be 8 candidate SS blocks in one SS block burst.

In another embodiment, one SS block burst may be configured identically to one SS block basic unit. In this case, in the embodiments shown in FIGS. 16 and 24, there may be 16 SS block bursts in the SS block window, and there may be 4 candidate SS blocks in each of 16 SS block bursts.

In another embodiment, the SS block burst may be a set of candidate SS blocks present in consecutive OFDM symbols. In this case, in the embodiments shown in FIGS. 16 and 24, there may be 32 SS block bursts in the SS block window, and there may be 2 candidate SS blocks in each of 32 SS block bursts.

In the embodiment shown in FIG. 27, there may be 8 SS block bursts within one SS block window, and 8 SS block bursts may be referred to as SS block bursts #0 to #7. Also, there may be 8 candidate SS blocks within one SS block burst, and 8 candidate SS blocks may be referred to as candidate SS blocks #0 to #7.

When the SS block bursts and the candidate SS blocks are configured as described above, the base station may inform the UE of the position in which the SS block is actually transmitted. For example, the base station may inform the UE of the index of the SS block burst and the index of the candidate SS block in which the SS block is actually transmitted. The index of the SS block burst in which the SS block is actually transmitted may be indicated in a bitmap form. If there are 8 SS block bursts, the bitmap may be composed of 8 bits. A specific bit set to '0' in the bitmap may indicate that the SS block is not transmitted in the SS block burst mapped to the specific bit. A specific bit set to 1' in the bitmap may indicate that the SS block is transmitted in the SS block burst mapped to the specific bit.

Also, the base station may inform the UE of the SS block transmittable positions in which the SS block is actually transmitted among the candidate SS blocks (e.g., SS block transmittable positions) belonging to the SS block burst. The SS block transmittable position (e.g., candidate SS block index) in which the SS block is actually transmitted may be indicated in a bitmap form. If there are 8 SS block bursts, the bitmap may be composed of 8 bits. A specific bit set to '0' in the bitmap may indicate that the SS block is not transmitted in the SS block transmittable position mapped to the specific bit. A specific bit set to 1' in the bitmap may indicate that the SS block is transmitted in the SS block transmittable position mapped to the specific bit.

In another embodiment, the base station may configure the positions in which the SS block is actually transmitted to have the same pattern (hereinafter, 'SS block pattern') in each of the SS block bursts, and inform the UE of the index of the SS block burst in which the SS block is actually transmitted and the SS block pattern. For example, in the embodiment shown in FIG. 27, when the SS block is actually transmitted in the SS block bursts #0 and #2 among the SS block bursts #0 to #7, the base station may inform the UE of the SS block bursts #0 and #2. Also, if there are the same candidate SS blocks #0 to #7 in the SS block bursts #0 and #2 and the same block pattern is applied, the base station may inform the UE of the SS block pattern together with the SS block bursts #0 and #2.

For example, when the SS block is actually transmitted in the candidate SS block #3 among the candidate SS blocks #0 to #7, the base station may transmit, to the UE, the SS block bursts #0 and #2, and an SS block pattern indicating the candidate SS block #3. The UE may receive the indexes of the SS block bursts (e.g., SS block bursts #0 and #2) and the SS block pattern (e.g., SS block pattern indicating the candidate SS block #3) from the base station. In this case, the UE may determine that the SS block is actually transmitted in the candidate SS block #3 of each of the SS block bursts #0 and #2.

The UE may identify the position in which the SS block is actually transmitted based on the information received from the base station, and perform rate matching at the transmission position of the identified SS block. For example, if the transmission position of the identified SS block is the SBI #n, the UE may not receive signals other than the SS block in the SBI #n. Also, if the transmission position of the identified SS block is a data transmission region, the UE may perform demodulation of data in REs other than REs to which the SS block is mapped among REs belonging to the transmission region.

Meanwhile, if the transmission position of the SS block indicated by the base station is included in a measurement interval configured for each UE, the UE may perform channel measurement operation at the transmission position of the SS block. On the other hand, if the transmission position of the SS block indicated by the base station is not included in the measurement interval configured for each UE, the UE may perform channel measurement operation at the transmission position of the SS block.

Figure 28:
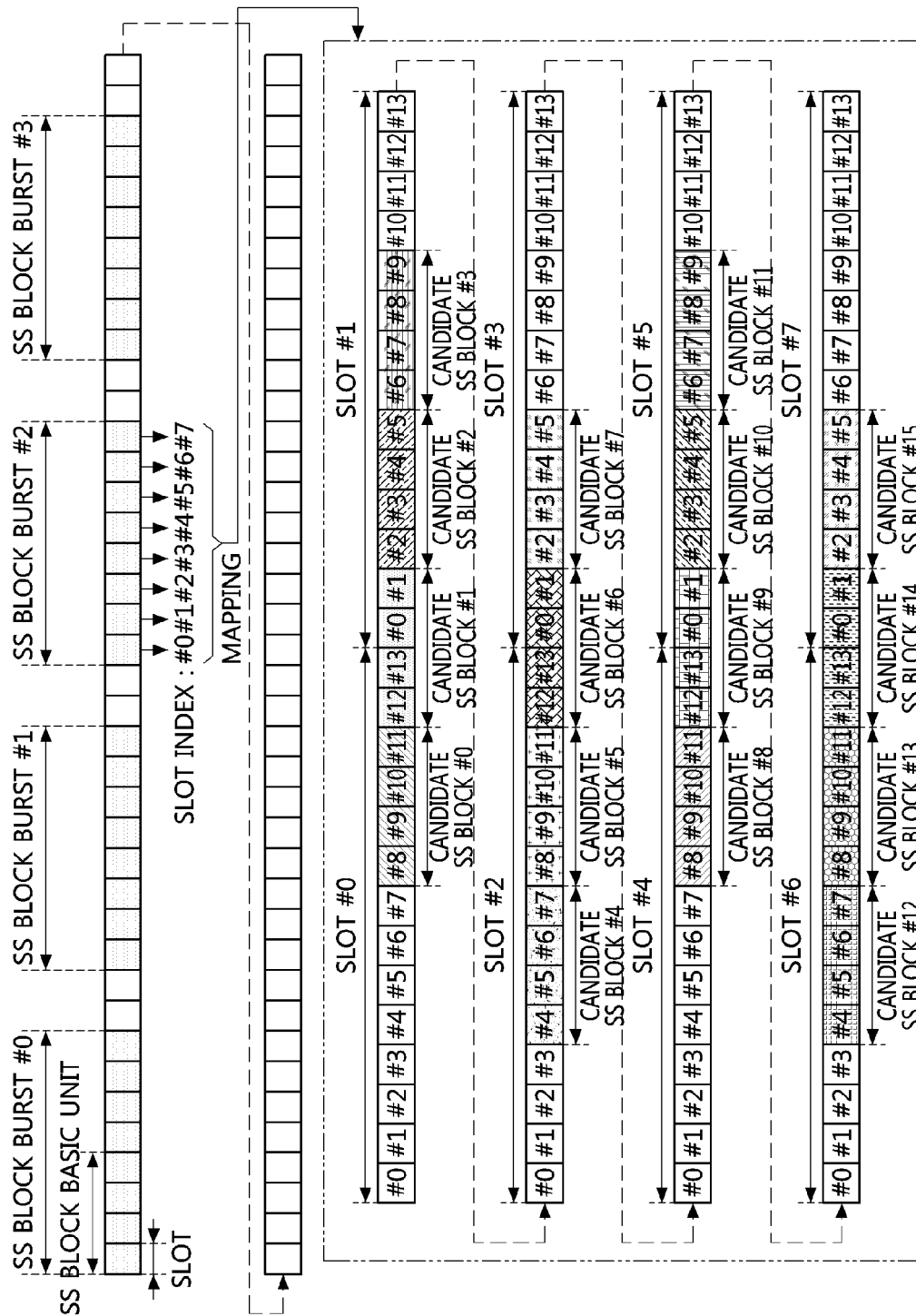
FIG. 28 is a conceptual diagram illustrating a second embodiment of SS block bursts in a wireless communication network.

FIG. 28 is a conceptual diagram illustrating a second embodiment of SS block bursts in a wireless communication network.

Referring to FIG. 28, SS block bursts may be configured in the wireless communication network using a 240 kHz subcarrier spacing. The SS block bursts may be configured and defined within one SS block window. The number of candidate SS blocks in one SS block window may be 64. The 64 candidate SS blocks may be divided in units of 16 candidate SS blocks so as to form 4 SS block bursts. The SS block burst may be a set of candidate SS blocks present in consecutive slots. The candidate SS block may be the same as the candidate SS block in the embodiment shown in FIG. 17 and FIG. 25. There may be 16 candidate SS blocks in one SS block burst.

In another embodiment, one SS block burst may be configured identically to one SS block basic unit. In this case, in the embodiments shown in FIGS. 17 and 25, there may be 8 SS block bursts in the SS block window, and there may be 8 candidate SS blocks in each of 8 SS block bursts.

In another embodiment, the SS block burst may be a set of candidate SS blocks present in consecutive OFDM symbols. In this case, in the embodiments shown in FIGS. 17 and 25, there may be 16 SS block bursts in the SS block window, and there may be 4 candidate SS blocks in each of 16 SS block bursts.

In the embodiment shown in FIG. 28, there may be 4 SS block bursts within one SS block window, and 4 SS block bursts may be referred to as SS block bursts #0 to #3. Also, there may be 16 candidate SS blocks within one SS block burst, and 16 candidate SS blocks may be referred to as candidate SS blocks #0 to #15.

Meanwhile, in order to transmit the SS block described above using different beams, beams for transmission of the SS block may be configured. The beam may be configured based on two schemes.

Beam Configuration Scheme #1

In the beam configuration scheme #1, each of the SS block bursts may be transmitted using a different beam, and SS blocks in each of the SS block bursts may be transmitted using the same beam.

In the embodiment (e.g., the wireless communication network in which a 120 kHz subcarrier spacing is used) shown in FIG. 27, the SS blocks may be transmitted using the same beam (e.g., the beam #0 shown in FIG. 26A) in the candidate SS blocks #0 to #7 in the SS block burst #0. Also, the SS blocks may be transmitted using the same beam (e.g., the beam #1 shown in FIG. 26A) in the candidate SS blocks #0 to #7 in the SS block burst #1. That is, the SS blocks belonging to different SS block bursts may be transmitted using different beams, and the SS blocks in the candidate SS blocks #0 to #7 in one SS block burst may be transmitted using the same beam.

The beam allocated for transmission of the SS block burst may be an evenly distributed beam as in the embodiments shown in FIGS. 26A-26C. In this case, k in Equation 22 may be the index of the SS block burst in the SS block window and n may be the number of SS block bursts belonging to the SS block window. When the beam configuration scheme #1 is used, a time (e.g., a transmission period of SS block) required to transmit the SS blocks through all the beams of the base station may be equal to the length (or, period) of the SS block window.

In the embodiment shown in FIG. 28 (e.g., the wireless communication network in which a 240 kHz subcarrier spacing is used), the SS blocks may be transmitted using the same beam (e.g., beam #0 shown in FIG. 26A) in the candidate SS blocks #0 to #15 of the SS block burst #0. Also, the SS blocks may be transmitted using the same beam (e.g., beam #1 shown in FIG. 26A) in the candidate SS blocks #0 to #15 of the SS block burst #1. That is, the SS blocks belonging to different SS block bursts may be transmitted using different beams, and the SS blocks in the candidate SS blocks #0 to #15 in one SS block burst may be transmitted using the same beam.

The beams allocated for transmission of the SS block burst may be evenly formed beams as in the embodiments shown in FIGS. 26A to 26C. In this case, k in Equation 22 may be the index of the SS block burst in the SS block window, and n may be the number of SS block bursts belonging to the SS block window. When the beam configuration scheme #1 is used, a time (e.g., transmission period of SS block) required to transmit the SS blocks through all the beams of the base station may be equal to the length (or, period) of the SS block window.

Beam Configuration Scheme #2

In the beam configuration scheme #2, SS blocks in one SS block burst may be transmitted using different beams. In this case, SS blocks having the same index (e.g., the same position) among the SS block bursts may be transmitted using the same beam.

In the embodiment (e.g., the wireless communication network in which a 120 kHz subcarrier spacing is used) shown in FIG. 27, the SS block bursts may be configured and defined in one SS block window. The SS blocks may be transmitted using different beams in each of the candidate SS blocks #0 to #7 belonging to one SS block burst. For example, in each of the candidate SS blocks #0 to #7 belonging to the SS block burst, the SS block may be transmitted using one of the beams #0 to #7 shown in FIG. 26A. That is, in the candidate SS block #0 belonging to the SS block burst, the SS block may be transmitted using the beam #0 shown in FIG. 26A, and in the candidate SS block #1 belonging to the SS block burst, the SS block may be transmitted using the beam #1 shown in FIG. 26A.

In the candidate SS blocks having the same index between SS block bursts, the SS blocks may be transmitted using the same beam. For example, the beam (e.g., the beam #3 shown in FIG. 26A) used for transmission of the SS block in the candidate SS block #3 in the SS block burst #0 may be the same as the beam (e.g., the beam #3 shown in FIG. 26A) used for transmission of the SS block in the candidate SS block #3 in the SS block burst #2.

The beam allocated for the candidate SS block may be an evenly formed beam as in the embodiments shown in FIGS. 26A to 26C. In this case, k in Equation 39 may be the index of the candidate SS block in the SS block burst, and n may be the number of the candidate SS blocks belonging to the SS block burst. When the beam configuration scheme #2 is used, a time (e.g., the transmission period of the SS block) required to transmit the SS blocks through all the beams of the base station may be equal to the length (or, period) of the SS block burst.

In the embodiment (e.g., the wireless communication network in which a 240 kHz subcarrier spacing is used) shown in FIG. 28, the SS block bursts may be configured and defined in one SS block window. The SS blocks may be transmitted using different beams in each of the candidate SS blocks #0 to #15 belonging to one SS block burst. For example, in each of the candidate SS blocks #0 to #15 belonging to the SS block burst, the SS block may be transmitted using one of the beams #0 to #15 shown in FIG. 26C. That is, in the candidate SS block #0 belonging to the SS block burst, the SS block may be transmitted using the beam #0 shown in FIG. 26C, and in the candidate SS block #1 belonging to the SS block burst, the SS block may be transmitted using the beam #1 shown in FIG. 26C.

In the candidate SS blocks having the same index between SS block bursts, the SS blocks may be transmitted using the same beam. For example, the beam (e.g., the beam #3 shown in FIG. 26C) used for transmission of the SS block in the candidate SS block #3 in the SS block burst #0 may be the same as the beam (e.g., the beam #3 shown in FIG. 26C) used for transmission of the SS block in the candidate SS block #3 in the SS block burst #2.

The beam allocated for the candidate SS block may be an evenly formed beam as in the embodiments shown in FIGS. 26A to 26C. In this case, k in Equation 39 may be the index of the candidate SS block in the SS block burst, and n may be the number of the candidate SS blocks belonging to the SS block burst. When the beam configuration scheme #2 is used, a time (e.g., the transmission period of the SS block) required to transmit the SS blocks through all the beams of the base station may be equal to the length (or, period) of the SS block burst.

On the other hand, in the embodiments shown in FIGS. 14, 15 and 18 (e.g., the wireless communication network in which a 15 kHz or 30 kHz subcarrier spacing is used), all candidate SS blocks belonging to one SS block window may be configured as one SS block burst. Alternatively, each of the candidate SS blocks belonging to the SS block window may be configured as a different SS block burst. Alternatively, separate beams may not be configured in the wireless communication network in which a 15 kHz or 30 kHz subcarrier spacing is used. In this case, n may be 1 in Equation 22, and only one beam may exist in the cell.

The base station may transmit a plurality of SS blocks multiplexed in the frequency axis in the same time interval. In this case, each of the plurality of SS blocks may be transmitted using a different frequency resource. The plurality of SS blocks may be classified into cell-defining SS block and measurement SS block. The cell-defining SS block may be used for synchronization estimation, channel estimation, channel measurement, and transmission of common information of a cell in a frequency band in which the cell-defining SS block is transmitted. The measurement SS block may be used for measuring a channel quality of a frequency band in which the measuring SS block is transmitted. The base station may transmit to the UE information indicating the type of the SS block (e.g., cell-defining SS block or measurement SS block). Information indicating the type of the SS block may be included in the corresponding SS block.

The SS blocks transmitted at different center frequencies in the same time interval may be generated based on the same cell ID or different cell IDs. In this case, the cell-defining SS block may be generated based on the ID of the cell operated by the base station transmitting the cell-defining SS block, and the measurement SS block may be generated based on an arbitrary cell ID. Also, the SS blocks transmitted at different center frequencies in the same time interval may be generated based on the same SBI (or, the same candidate SS block index). Alternatively, the SS blocks transmitted at different center frequencies in the same time interval may be generated based on the SBI (or, the candidate SS block index) defined for each time interval in the embodiments shown in FIGS. 14 to 17. The measurement SS block may be generated based on an arbitrary SBI (or, an arbitrary candidate SS block index).

The base station may inform the UE whether the measurement SS block is transmitted or not. In this case, the position of the measurement SS block in the time axis may be the same as the position of the cell-defining SS block. When the measurement SS block is transmitted, the base station may inform the UE of the position of the time-frequency resources through which the measurement SS block is transmitted. In this case, the position of the measurement SS block in the frequency axis may be indicated by an offset from the position of the cell-defining SS block. When the center frequency of the measurement SS block is lower than the center frequency of the cell-defining SS block, a sign of the offset indicating the position of the measurement SS block in the frequency axis may be set to 'minus (−)'.

When the center frequency of the measurement SS block is higher than the center frequency of the cell-defining SS block, the sign of the offset indicating the position of the measurement SS block in the frequency axis may be set to 'plus (+)'. Here, the units of the offset may be subcarriers or RBs, and may be defined based on a subcarrier spacing applied to the cell-defining SS block or a reference subcarrier spacing. The reference subcarrier spacing may be pre-configured for each frequency band (e.g., bandwidth part).

Meanwhile, the base station may transmit to the UE an upper layer message (e.g., an RRC message) indicating whether or not the measurement SS block is transmitted and the position of the measurement SS block in the frequency axis. The UE may receive the upper layer message from the base station, identify the information indicated by the upper layer message (e.g., whether or not the measurement SS block is transmitted and the position of the measurement SS block in the frequency axis), identify the frequency resources through which the measurement SS block is transmitted based on the received information, and perform rate matching on the identified time-frequency resources. For example, the UE may not perform a detection operation of downlink signals in the time-frequency resources indicated by the base station as time-frequency resource for transmission of the SS block. When the time-frequency resources indicated as the time-frequency resources for transmission of the SS block belong to a data transmission region, the UE may perform a demodulation operation of data in REs other than REs to which the SS block is mapped, among REs constituting the data transmission region.

The UE may perform a channel measurement operation in the time-frequency resources in which the SS block is transmitted. For example, when the time interval during which the SS block is transmitted belongs to a channel measurement interval, the UE may perform a channel measurement operation in the time-frequency resources in which the SS block is transmitted. Meanwhile, when the measurement SS block is transmitted in addition to the cell-defining SS block, and the UE confirms that the cell-defining SS block and the measurement SS block are transmitted, the UE may perform a channel measurement operation in each of the time-frequency resources through which the cell-defining SS block is transmitted and the time-frequency resources through which the measurement SS block is transmitted.

The UE may transmit, to the base station, a channel measurement result in the time-frequency resources through which the cell-defining SS block is transmitted, and a channel measurement result in the time-frequency resources through which the measurement SS block is transmitted. The UE may transmit, to the base station, an average of the channel measurement result in the time-frequency resources through which the cell-defining SS block is transmitted, and the channel measurement result in the time-frequency resources through which the measurement SS block is transmitted. When the UE is informed that the measurement SS block is transmitted and the time interval through which the measurement SS block is transmitted does not belong to the channel measurement interval, the UE may not perform the channel measurement operation in the time interval during which the measurement SS block is transmitted.

On the other hand, the information indicating the actual transmission position of the SS block described above (hereinafter, referred to as a 'transmission indicator') may be transmitted through an upper layer message (e.g., an RRC message). A method for transmitting and receiving an SS block based on the transmission indicator configured by the RRC message may be as follows.

Figure 29:
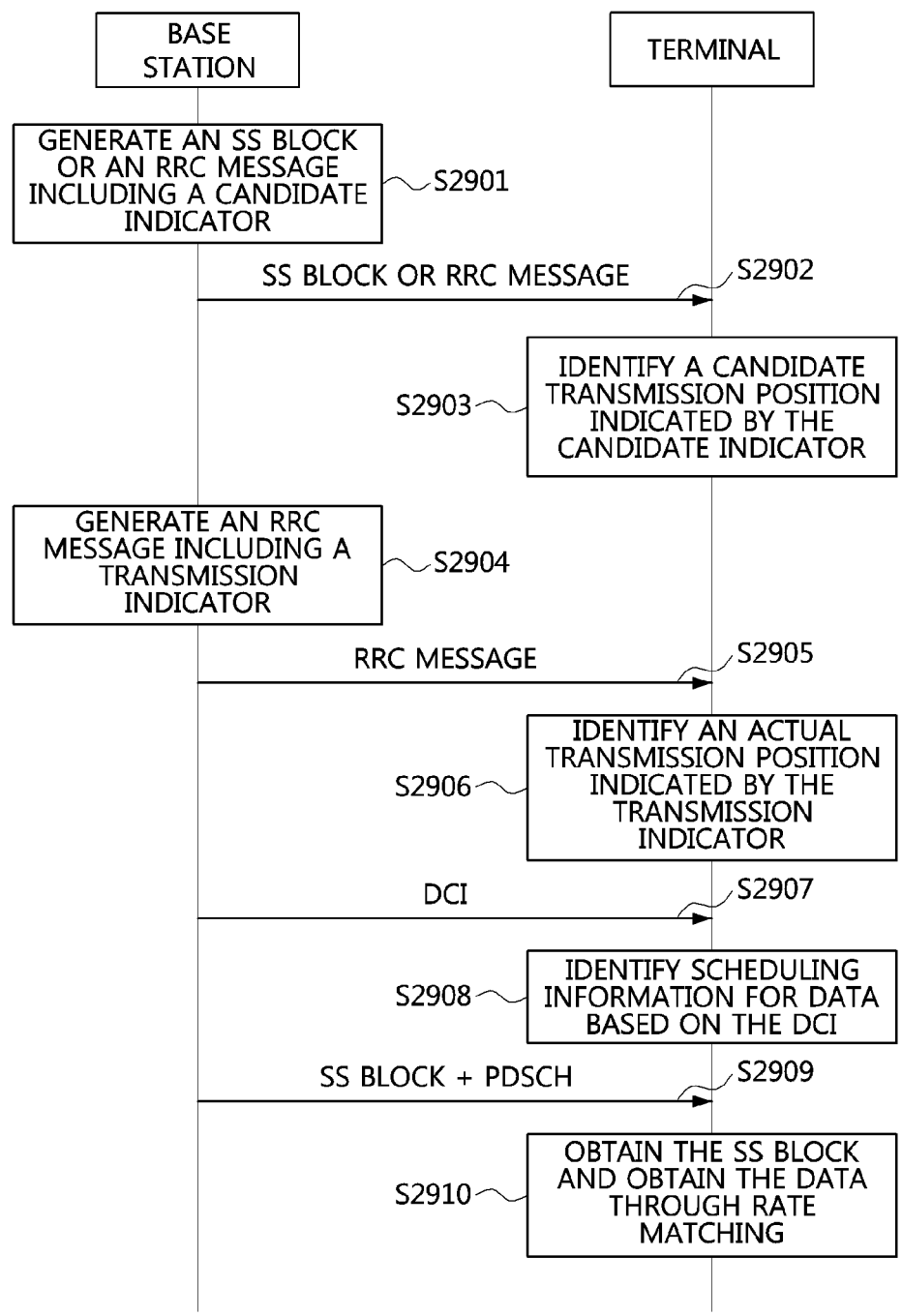
FIG. 29 is a sequence chart illustrating a first embodiment of a method for transmitting and receiving an SS block in a wireless communication network.

FIG. 29 is a sequence chart illustrating a first embodiment of a method for transmitting and receiving an SS block in a wireless communication network.

Referring to FIG. 29, the wireless communication network may include a base station, a terminal, and the like. Each of the base station and the terminal may be configured to be the same as or similar to the communication node 200 shown in FIG. 2. The base station may generate an SS block or an RRC message including information (hereinafter referred to as 'candidate indicator') indicating candidate transmission positions of SS block (S2901). The candidate transmission positions may be positions in which the SS block can be transmitted. Therefore, the SS block may or may not be transmitted in the candidate transmission positions. The candidate indicator may indicate a transmission periodicity, a transmission interval, a transmission pattern, a transmission resource, and the like of the SS block.

The base station may transmit an SS block or an RRC message including the candidate indicator (S2902). Here, the RRC message including the candidate indicator may be a cell-specific RRC message that all UEs belonging to the cell of the base station can receive. The terminal may receive the SS block or the RRC message from the base station, and may identify the candidate transmission positions of SS block based on the candidate indicator included in the SS block or the RRC message (S2903). However, when the candidate transmission positions of SS block are preconfigured in the base station and the terminal, the steps S2901 to S2903 may be omitted.

The base station may generate an RRC message including a transmission indicator indicating an actual transmission position of the SS block (S2904). The actual transmission position may be at least one of the candidate transmission positions indicated by the candidate indicator. The transmission indicator may be configured in a bitmap form. For example, when the number of candidate transmission positions of SS block is 8, the size of the transmission indicator may be 8 bits. In this case, one bit among the bits constituting the transmission indicator may indicate whether or not the SS block is transmitted at a candidate transmission position corresponding to the corresponding bit. Here, the RRC message including the transmission indicator may be a UE-specific RRC message.

Also, the RRC message may further include at least one of information indicating an index of a half frame in which the SS block is transmitted, information indicating an index of an SS block burst in which the SS block is transmitted, and information indication a type of the SS block transmitted at the transmission position indicated by the transmission indicator. The information indicating the index of the SS block burst in which the SS block is transmitted may be configured in a bitmap form. The type of the SS block may be classified into a cell-defining SS block and a measurement SS block.

The base station may transmit the RRC message to the terminal (S2905). The UE may receive the RRC message from the base station, and identify the information included in the RRC message. For example, based on the RRC message, the UE may identify the information indicating the index of the half frame in which the SS block is transmitted, the information indicating the index of the SS block burst in which the SS block is transmitted, the information indication the type of the SS block, or the like. That is, the UE may identify the actual transmission position of the SS block based on the transmission indicator included in the RRC message (S2906).

On the other hand, if there is data to be transmitted to the UE, the base station may generate scheduling information (e.g., time-frequency resources, modulation and coding scheme (MCS), etc.) for the data, and transmit a DCI including the scheduling information through a physical downlink control channel (PDCCH) (S2907). The UE may receive the DCI from the base station, and may identify the scheduling information for the data included in the DCI (S2908).

The base station may transmit an SS block at the transmission position indicated by the transmission indicator configured by the RRC message (S2909). Further, in the step S2909, the base station may transmit the data (e.g., physical downlink shared channel (PDSCH)) to the UE in the time-frequency resources indicated by the DCI. However, when the transmission position indicated by the transmission indicator overlaps with the time-frequency resources (e.g., PDSCH) indicated by the DCI, the base station may rate-match the data to remaining REs other than REs occupied by the SS block among all REs constituting the PDSCH, and transmit the data to the UE using the remaining REs.

The terminal may obtain the SS block by monitoring the resources indicated by the transmission indicator included in the RRC message (S2910). When it is determined that the transmission position indicated by the transmission indicator is overlapped with the time-frequency resources (e.g., PDSCH) indicated by the DCI, the UE may determine that the data is rate-matched to the remaining REs other than the REs occupied by the SS block among all the REs constituting the PDSCH. Accordingly, in the step S2907, the UE may obtain the data by performing rate matching on the REs other than the REs occupied by the SS block among all the REs constituting the PDSCH.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a terminal in a wireless communication system, the operation method comprising:
   receiving a radio resource control (RRC) message including an indicator indicating an actual transmission position of a synchronization signal (SS) block from a base station, the SS block including a synchronization signal, a physical broadcast channel (PBCH), and a demodulation reference signal (DMRS);
   identifying the actual transmission position indicated by the indicator included in the RRC message;
   acquiring the SS block from the base station by performing a monitoring operation at the actual transmission position indicated by the indicator;
   when the acquired SS block is a cell-defining SS block, performing a reception operation of common information using the cell-defining SS block; and
   when the acquired SS block is a measurement SS block, measuring channel quality using the measurement SS block.

2. The operation method according to claim 1, further comprising, when the actual transmission position indicated by the indicator is overlapped with a physical downlink shared channel (PDSCH) scheduled by the base station, obtaining data by performing rate matching on resource elements (REs) other than REs occupied by the SS block among REs constituting the PDSCH.

3. The operation method according to claim 1, further comprising receiving information indicating candidate transmission positions of the SS block from the base station before receiving the RRC message including the indicator, wherein the actual transmission position is one or more among the candidate transmission positions.

4. The operation method according to claim 1, wherein no signal other than the SS block is received in the actual transmission position indicated by the indicator.

5. The operation method according to claim 1, wherein the RRC message includes information indicating an index of a half frame through which the SS block is transmitted.

6. The operation method according to claim 1, wherein the RRC message includes information indicating an index of an SS block burst through which the SS block is transmitted.

7. The operation method according to claim 6, wherein information indicating the index of the SS block burst is configured in a bitmap form.

8. The operation method according to claim 1, wherein a type of the acquired SS block is one of the cell-defining SS block and the measurement SS block, and information indicating the type of the SS block is included in the RRC message.

9. The operation method according to claim 1, further comprising:
   obtaining information indicating an index of the SS block based on a sequence used for generating the DMRS included in the SS block.

10. The operation method according to claim 9, wherein the sequence is determined based on the information indicating the index of the SS block and a cell identifier (ID) of the base station.

11. The operation method according to claim 9, wherein, when the information indicating the index of the SS block is configured using x bits, y bits among the x bits are used for indicating the index of the SS block, (x-y) bits among the x bits are used for indicating an index of a half frame through which the SS block is transmitted, each of x and y is an integer equal to or greater than 1, and y is an integer less than x.

12. The operation method according to claim 9, wherein the PBCH includes information indicating an index of a half frame through which the SS block is transmitted.

13. The operation method according to claim 9, wherein the PBCH includes information indicating an index of an SS block burst through which the SS block is transmitted.

14. The operation method according to claim 13, wherein the information indicating the index of the SS block burst is configured in a bitmap form.

15. The operation method according to claim 9, wherein a type of the SS block is a cell-defining SS block or a measurement SS block, and information indicating the type of the SS block is included in the SS block.

16. The operation method according to claim 1, further comprising:
   estimating y bits among x bits indicating a number of a system frame through which the SS block is transmitted based on a sequence used for scrambling the PBCH included in the SS block;
   obtaining z bits among the x bits indicating the number of the system frame through which the SS block is transmitted by decoding the PBCH included in the SS block; and
   identifying the number of the system frame based on the y bits and the z bits, wherein each of x, y and z is an integer equal to or greater than 1, and each of y and z is an integer equal to or less than x.

17. The operation method according to claim 16, wherein the y bits are most significant bits (MSBs) among the x bits, and the z bits are least significant bits (LSBs) among the x bits.

18. The operation method according to claim 16, wherein the y bits are LSBs among the x bits, and the z bits are MSBs among the x bits.

19. The operation method according to claim 16, wherein the sequence is determined based on the y bits and a cell identifier (ID) of the base station.

20. The operation method according to claim 16, wherein a type of the SS block is a cell-defining SS block or a measurement SS block, and information indicating the type of the SS block is included in the SS block.

* * * * *